US012707196B2

(12) United States Patent
Kim et al.

(10) Patent No.: US 12,707,196 B2
(45) Date of Patent: Aug. 11, 2026

(54) ELECTRONIC APPARATUS AND CONTROLLING METHOD THEREOF

(71) Applicant: SAMSUNG ELECTRONICS CO., LTD., Suwon-si (KR)

(72) Inventors: Minsang Kim, Suwon-si (KR); Changhun Bae, Suwon-si (KR); Seokhyun Yoon, Suwon-si (KR); Taehwa Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 90 days.

(21) Appl. No.: 18/581,972

(22) Filed: Feb. 20, 2024

(65) Prior Publication Data

US 2024/0196131 A1 Jun. 13, 2024

Related U.S. Application Data

(63) Continuation of application No. PCT/KR2022/012272, filed on Aug. 17, 2022.

(30) Foreign Application Priority Data

Sep. 7, 2021 (KR) ........................ 10-2021-0119331

(51) Int. Cl.
*H04R 3/00* (2006.01)
*G06F 3/16* (2006.01)

(52) U.S. Cl.
CPC ............... *H04R 3/00* (2013.01); *G06F 3/162* (2013.01); *H04R 2420/07* (2013.01); *H04R 2430/01* (2013.01)

(58) Field of Classification Search
CPC .. G06F 3/162; H04N 21/4104; H04N 21/436; H04N 21/43635; H04N 21/439;
(Continued)

(56) References Cited

U.S. PATENT DOCUMENTS 9,008,164 B2 4/2015 Hong et al.
9,578,210 B2 2/2017 Lee et al.
(Continued)

FOREIGN PATENT DOCUMENTS

CN 109803170 A 5/2019
JP 2017-126926 7/2017
(Continued)

OTHER PUBLICATIONS

International Search Report, PCT/ISA/210, dated Dec. 5, 2022, in PCT Application No. PCT/KR2022/012272.
(Continued)

*Primary Examiner* — Lun-See Lao
(74) *Attorney, Agent, or Firm* — STAAS & HALSEY LLP

(57) ABSTRACT

An electronic apparatus including a communication interface; and a processor configured to obtain a first signal in an enhanced audio return channel (eARC) format based on a predetermined parameter, control the communication interface to transmit the obtained first signal to an external speaker, change the parameter based on receiving, through the communication interface, a first error signal corresponding to the first signal transmitted from the external speaker, obtain a second signal in the eARC format based on the changed parameter, and control the communication interface to transmit the obtained second signal to the external speaker.

15 Claims, 25 Drawing Sheets

(58) Field of Classification Search
CPC ............... H04N 21/8106; H04N 5/602; H04R 2420/07; H04R 2430/01; H04R 3/00; H04R 3/12; H04R 5/04
USPC ................................................ 381/77, 56–58
See application file for complete search history.

(56) References Cited

U.S. PATENT DOCUMENTS

| | | | | |
|---|---|---|---|---|
| 11,146,757 | B2 | 10/2021 | Komori et al. | |
| 11,175,885 | B2 | 11/2021 | Kim | |
| 2014/0016684 | A1* | 1/2014 | Hong | G09G 5/006 375/232 |
| 2017/0228213 | A1 | 8/2017 | Kim et al. | |
| 2019/0123728 | A1 | 4/2019 | Zhao et al. | |
| 2020/0344445 | A1 | 10/2020 | Komori et al. | |
| 2020/0351465 | A1 | 11/2020 | Wolff et al. | |
| 2021/0034322 | A1* | 2/2021 | Kim | G06F 3/165 |
| 2021/0136126 | A1 | 5/2021 | Renade et al. | |
| 2022/0382535 | A1* | 12/2022 | Hoarty | H04N 21/439 |

FOREIGN PATENT DOCUMENTS

| | | |
|---|---|---|
| JP | 2020-182028 | 11/2020 |
| KR | 10-0661551 | 12/2006 |
| KR | 10-2012-0037580 | 4/2012 |
| KR | 10-2012-0074700 | 7/2012 |
| KR | 10-2014-0007698 | 1/2014 |
| KR | 10-2140612 | 8/2020 |
| KR | 10-2021-0015476 | 2/2021 |
| KR | 10-2292427 | 8/2021 |

OTHER PUBLICATIONS

Written Opinion, PCT/ISA/237, dated Dec. 5, 2022, in PCT Application No. PCT/KR2022/012272.

Office Action date Sep. 18, 2025, in Korean Patent Application No. 10-2021-0119331.

Office Action dated May 26, 2026, issued in Korean Application No. 10-2021-0119331.

* cited by examiner

INCREASE IN AMPLITUDE

DECREASE IN AMPLITUDE

INCREASE IN DUTY CYCLE

DECREASE IN DUTY CYCLE

DECREASE IN RISE TIME

INCREASE IN FALL TIME

DECREASE IN FALL TIME

| SIGNAL | AMPLITUDE | DUTY CYCLE | RISE TIME | FALL TIME | NUMBER OF ERRORS |
|---|---|---|---|---|---|
| FIRST TEST SIGNAL | 100mV | 30% | 10ms | 10ms | 3 |
| SECOND TEST SIGNAL | 120mV | 30% | 10ms | 10ms | 0 |
| THIRD TEST SIGNAL | 100mV | 60% | 10ms | 10ms | 2 |
| FOURTH TEST SIGNAL | 100mV | 30% | 20ms | 10ms | 1 |

ELECTRONIC APPARATUS AND CONTROLLING METHOD THEREOF

CROSS-REFERENCE TO RELATED APPLICATIONS

This is a continuation application of International Application No. PCT/KR2022/012272, filed Aug. 17, 2022, which is incorporated herein by reference in its entirety, it being further noted that foreign priority benefit is based upon Korean Patent Application No. 10-2021-0119331, filed Sep. 7, 2021, which is incorporated by reference herein in its entirety.

TECHNICAL FIELD

The disclosure relates to an electronic apparatus and a controlling method thereof and, more particularly to, an electronic apparatus for transmitting an enhanced audio return channel (eARC) signal and a controlling method thereof.

BACKGROUND ART

A source device (for example, a personal computer (PC), a game device, a blue ray disc player, a set-top box, etc.), a sink device (for example, a TV, a beam projector, and the like) and an audio output device (e.g., a sound bar and an audio/video (AV) receiver) may be connected by a high-definition multimedia interface (HDMI) for communication. Specifically, a source device and a sink device may be connected by HDMI. In addition, the sink device and the sound output device may be connected by HDMI.

In order to output high-definition and high-quality content, the sink device and the sound output device may use an enhanced audio return channel (eARC) function. When the sink device and the sound output device use an eARC function, a dedicated cable for supporting a corresponding function needs to be used.

However, if a cable supporting the eARC function is not used, a performance problem (e.g., audio output failure, audio sound disconnection, noise generation) may occur.

DISCLOSURE OF INVENTION

Technical Problem

The disclosure is devised to address the aforementioned problem. The purpose of the disclosure is to provide an electronic apparatus for transmitting, to an external speaker, a signal in which an error does not occur by changing a parameter in transmitting a signal in an eARC format, and a controlling method therefor.

Solution to Problem

An electronic apparatus according to an embodiment includes a communication interface, and a processor configured to obtain a first signal in an enhanced audio return channel (eARC) format based on a predetermined parameter, control the communication interface to transmit the obtained first signal to an external speaker, based on receiving, through the communication interface, a first error signal corresponding to the first signal transmitted from the external speaker, change the parameter, obtain a second signal in the eARC format based on the changed parameter, and control the communication interface to transmit the obtained second signal to the external speaker.

In the meantime, the parameter may include at least one of an amplitude, a duty cycle, a rise time, or a fall time of a signal.

In the meantime, the processor is configured to, based on receiving the first error signal corresponding to the first signal transmitted from the external speaker, obtain the second signal by increasing an amplitude of the first signal by first magnitude.

In the meantime, the processor is configured to, based on receiving, through the communication interface, a second error signal corresponding to the second signal transmitted from the external speaker, obtain a third signal by increasing an amplitude of the second signal by a second magnitude greater than the first magnitude, and control the communication interface to transmit the obtained third signal to the external speaker.

In the meantime, the processor is configured to obtain sampling data included in the first error signal, change the parameter based on the sampling data, and obtain the second signal based on the changed parameter.

In the meantime, the processor is configured to, based on data at a predetermined first time point included in the sampling data being less than a threshold value, increase the duty cycle, and obtain the second signal based on the increased duty cycle.

In the meantime, the processor is configured to, based on a data at a predetermined first time point included in the sampling data being less than a threshold value, decrease the rise time and the fall time, and obtain the second signal based on the decreased rise time and the decreased fall time.

In the meantime, the processor is configured to, based on receiving a high-definition multimedia interface (HDMI) signal from an external source device through the communication interface, change the received HDMI signal to the first signal in the eARC format, and control the communication interface to transmit the first signal in the eARC format to the external speaker.

In the meantime, the communication interface may include a common mode data channel (CMDC), and the processor is configured to transmit the first signal including control information to the external speaker through the CMDC, based on receiving the first error signal corresponding to the first signal transmitted from the external speaker, change the parameter, and obtain the second signal based on the changed parameter, and the changed parameter used in obtaining the second signal may include at least one of an amplitude, a rise time, or a fall time of a signal.

In the meantime, the communication interface may include a differential mode audio channel (DMAC), and the processor is configured to transmit the first signal including audio data to the external speaker through the DMAC, based on receiving the first error signal corresponding to the first signal from the external speaker, change the parameter, obtain the second signal based on the changed parameter, and the changed parameter used in obtaining the second signal may include at least one of an amplitude, a duty cycle, a rise time, or a fall time of a signal.

A controlling method of an electronic apparatus according to an embodiment includes obtaining a first signal in an enhanced audio return channel (eARC) format based on a predetermined parameter, transmitting the obtained first signal to an external speaker, based on receiving a first error signal corresponding to the first signal transmitted from the external speaker, changing the parameter, obtaining a second signal in the eARC format based on the changed parameter, and transmitting the obtained second signal to the external speaker.

In the meantime, the parameter may include at least one of an amplitude, a duty cycle, a rise time, or a fall time of a signal.

In the meantime, the obtaining the second signal may include, based on receiving the first error signal corresponding to the first signal transmitted from the external speaker, obtaining the second signal by increasing an amplitude of the first signal by first magnitude.

In the meantime, the method may further include, based on receiving a second error signal corresponding to the second signal from the external speaker, obtaining a third signal by increasing the amplitude of the second signal by a second magnitude greater than the first magnitude, and transmitting the obtained third signal to the external speaker.

In the meantime, the obtaining the second signal may include obtaining sampling data included in the first error signal, change the parameter based on the sampling data, and obtaining the second signal based on the changed parameter.

In the meantime, the obtaining the second signal may include, based on the data at the predetermined first time point included in the sampling data being less than a threshold value, increasing the duty cycle, and obtaining the second signal based on the increased duty cycle.

In the meantime, the obtaining the second signal may include, based on a data at a predetermined first time point included in the sampling data being less than a threshold value, decreasing the rise time and the fall time, and obtaining the second signal based on the decreased rise time and the decreased fall time.

In the meantime, the method may include, based on receiving a high-definition multimedia interface (HDMI) signal from an external source device through the communication interface, changing the received HDMI signal to the first signal in the eARC format, and transmitting the converted first signal to the external speaker.

In the meantime, the transmitting the first signal may include transmitting the first signal including control information to the external speaker through the CMDC, and the obtaining the second signal may include, based on receiving the first error signal corresponding to the first signal from the external speaker, changing the parameter, and obtaining the second signal based on the changed parameter, and the changed parameter used in obtaining the second signal may include at least one of an amplitude, a rise time, or a fall time of a signal.

In the meantime, the transmitting the first signal may include transmitting the first signal including audio data to the external speaker through the DMAC, based on receiving the first error signal corresponding to the first signal from the external speaker, change the parameter, obtaining the second signal based on the changed parameter, and the changed parameter used in obtaining the second signal may include at least one of an amplitude, a duty cycle, a rise time, or a fall time of a signal.

BRIEF DESCRIPTION OF DRAWINGS

FIG. 24 is a table illustrating a test signal.

MODE FOR INVENTION

Figure 1:
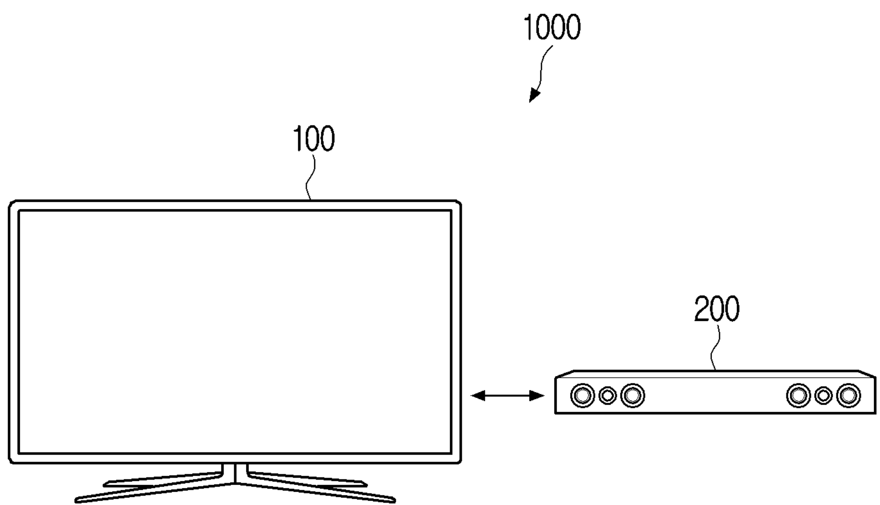
FIG. 1 is a system diagram illustrating an embodiment of outputting audio data according to an embodiment of the disclosure.

The disclosure will be described in greater detail with reference to the attached drawings.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be selected by the applicant, in which case the term will be described in detail in the description of the corresponding disclosure. Thus, the term used in this disclosure should be defined based on the meaning of term, not a simple name of the term, and the contents throughout this disclosure.

Expressions such as “have,” “may have,” “include,” “may include” or the like represent presence of corresponding numbers, functions, operations, or parts, and do not exclude the presence of additional features.

Expressions such as “at least one of A or B” and “at least one of A and B” should be understood to include any of the following: “A,” “B” or “A and B.” Similarly, as an additional example, expressions such as “at least one of A, B, or C” should be understood to include any of the following: “A”, “B’, “C”, “A and B”, “A and C”, “B and C”, “A, B, C”.

As used herein, terms such as “first,” and “second,” may identify corresponding components, regardless of order and/or importance, and are used to distinguish a component from another without limiting the components.

In addition, a description that one element (e.g., a first element) is operatively or communicatively coupled with/to” or “connected to” another element (e.g., a second element) should be interpreted to include both the first element being directly coupled to the second element, and the first element being indirectly coupled to the second element through a third element.

A singular expression includes a plural expression, unless otherwise specified. It is to be understood that terms such as “comprise” or “consist of” are used herein to designate a presence of a characteristic, number, step, operation, element, component, or a combination thereof, and not to preclude a presence or a possibility of adding one or more of other characteristics, numbers, steps, operations, elements, components or a combination thereof.

A term such as “module,” “unit,” and “part,” is used to refer to an element that performs at least one function or operation and that may be implemented as hardware or software, or a combination of hardware and software. Except when each of a plurality of “modules,” “units,” “parts,” and the like must be realized in an individual hardware, the components may be integrated in at least one module or chip and be realized in at least one processor.

In the following description, a “user” may refer to a person using an electronic apparatus or an artificial intelligence electronic apparatus using an electronic apparatus (e.g., artificial intelligence electronic apparatus).

An embodiment of the disclosure will be described in more detail with reference to the accompanying drawings.

FIG. 1 is a system diagram illustrating an embodiment of outputting audio data according to an embodiment of the disclosure.

Referring to FIG. 1, the system 1000 may include the electronic apparatus 100 and the external speaker 200.

Here, the electronic apparatus 100 may be an apparatus to store audio data. The electronic apparatus 100 may be a sink device, and may be a, for example, television (TV), a beam projector, or the like.

Here, the external speaker 200 may be a device to output audio data as an acoustic output device. For example, the external speaker 200 may be a sound bar, an AV receiver, or the like.

The electronic apparatus 100 may transmit the stored audio data to the external speaker 200, and the external speaker 200 may output audio data received from the electronic apparatus 100. Here, the electronic apparatus 100 and the external speaker 200 may communicate by using the eARC function.

Figure 2:
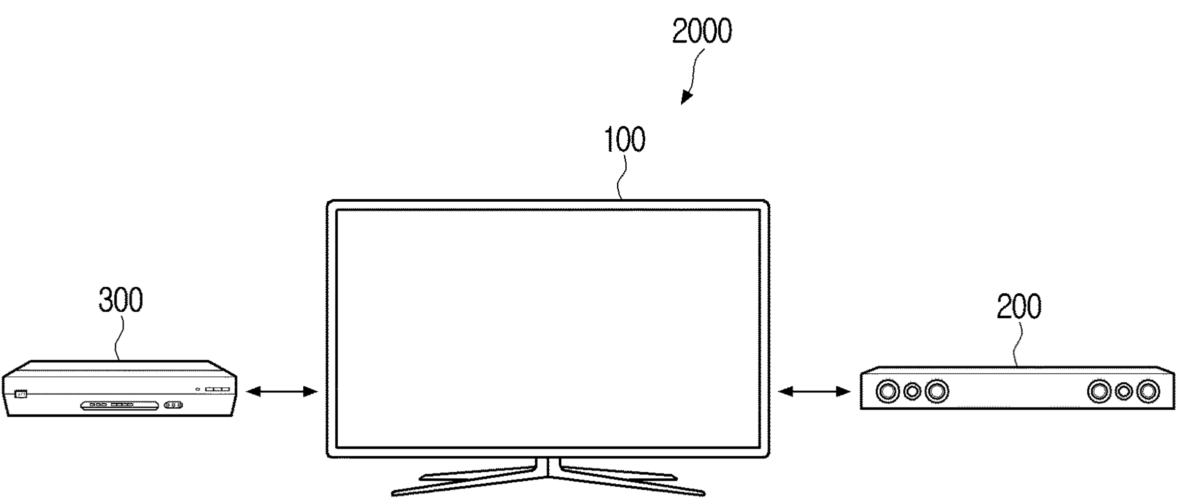
FIG. 2 is a system diagram illustrating an embodiment of outputting audio data according to another embodiment of the disclosure.

FIG. 2 is a system diagram illustrating an embodiment of outputting audio data according to another embodiment of the disclosure.

Referring to FIG. 2, a system 2000 may include the electronic apparatus 100, the external speaker 200, and an external source device 300.

The description relating to the electronic apparatus 100 and the external speaker 200 has been provided with reference to FIG. 1, and a duplicate description will be omitted.

The external source device 300 may be a source device to provide the electronic apparatus 100 with audio data. For example, the external source device 300 may be a PC, a game machine, a Blue ray disc player, a set-top box, or the like.

The external source device 300 may transmit the content to the electronic apparatus 100. Here, the electronic apparatus 100 and the external source device 300 may communicate by using High-Definition Multimedia Interface (HDMI).

The electronic apparatus 100 may transmit the audio data received from the external source device 300 to the external speaker 200. Here, the electronic apparatus 100 and the external speaker 200 may communicate by using the eARC function.

The signal transmitted from the external source device 300 to the electronic apparatus 100 may be an HDMI signal or an HDMI-general signal. A signal transmitted from the electronic apparatus 100 to the external speaker 200 100 may be an eARC signal. Here, the eARC signal may also be described as an HDMI-eARC signal in that an HDMI is also used. In the following description, for the convenience of the description, an eARC signal is used instead of the HDMI-eARC for convenience of description.

Figure 3:
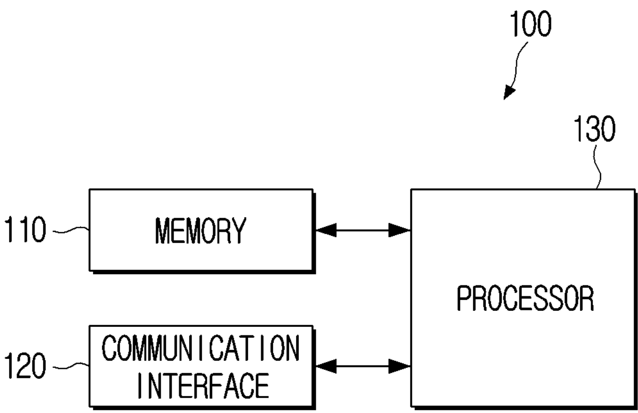
FIG. 3 is a block diagram illustrating an electronic apparatus according to an embodiment of the disclosure.

FIG. 3 is a block diagram illustrating the electronic apparatus 100 according to an embodiment of the disclosure.

Referring to FIG. 3, the electronic apparatus 100 may include a memory 110, a communication interface 120, and a processor 130.

The memory 110 may be implemented as an internal memory such as, for example, and without limitation, a read-only memory (ROM) (for example, electrically erasable programmable read-only memory (EEPROM)), a random-access memory (RAM) or a memory separate from the processor 130. In this case, the memory 110 may be implemented as at least one of a memory embedded within the electronic apparatus 100 or a memory detachable from the electronic apparatus 100 according to the usage of data storage. For example, the data for driving the electronic apparatus 100 may be stored in the memory embedded within the electronic apparatus 100, and the data for upscaling of the electronic apparatus 100 may be stored in the memory detachable from the electronic apparatus 100.

The communication interface 120 performs communication with various types of external devices according to various types of communication methods. For example, the communication interface 120 may include a Wi-Fi module, a Bluetooth module, an infrared communication module, a wireless communication module, and the like. The Wi-Fi module and the Bluetooth module perform communication in a Wi-Fi method and a Bluetooth method, respectively. The wireless communication module may include at least one communication chip that performs communication according to various wireless communication standards such as Zigbee, 3rd Generation (3G), 3rd Generation Partnership Project (3 GPP), Long Term Evolution (LTE), LTE Advanced (LTE-A), 4th Generation (4G), and 5th Generation (5G).

Figure 4:
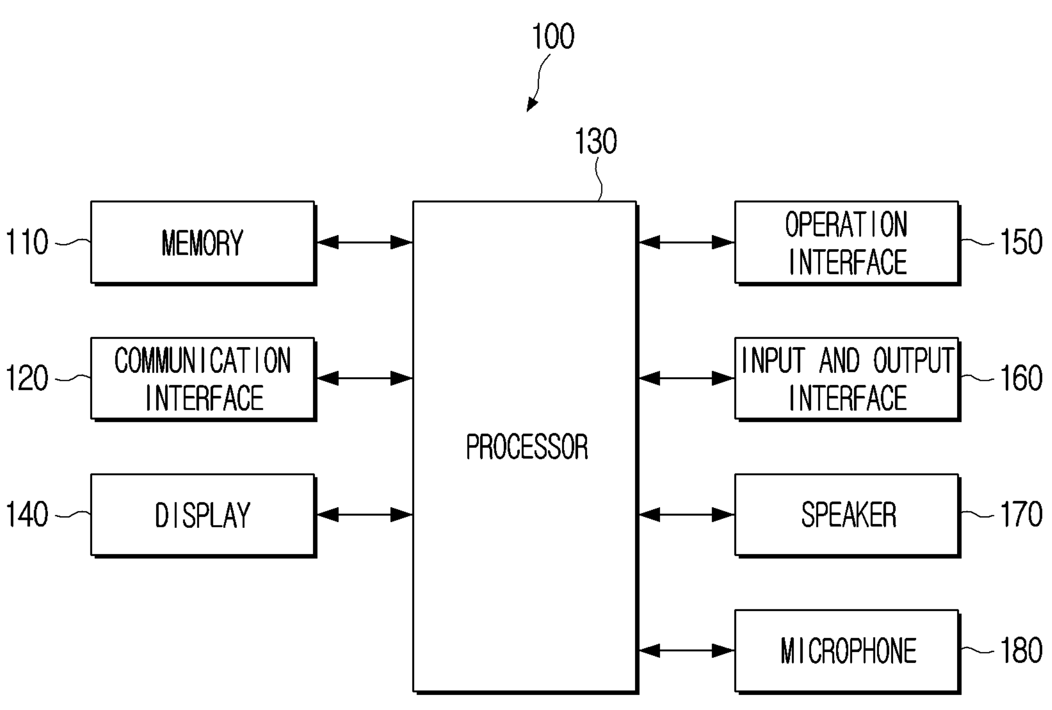
FIG. 4 is a block diagram illustrating a specific configuration of the electronic apparatus of FIG. 3.

In the meantime, the communication interface 120 may be connected to an input and output interface 160 (FIG. 4). Accordingly, the communication interface 120 may transmit information to an external device or receive information from an external device by using the input and output interface 160.

The processor 130 may perform an overall control operation of the electronic apparatus 100. Specifically, the processor 130 functions to control the overall operation of the electronic apparatus 100.

The processor 130 may be implemented with, for example, and without limitation, a digital signal processor (DSP) for processing of a digital signal, a microprocessor, a time controller (TCON). The processor 130 may include, for example, and without limitation, one or more among a central processor (CPU), a micro controller unit (MCU), a micro processor (MPU), a controller, an application processor (AP), a graphics-processing unit (GPU), a communication processor (CP), an advanced reduced instruction set computing (RISC) machine (ARM) processor, or may be defined as a corresponding term. The processor 130 may be implemented in a system on chip (SoC) type or a large scale integration (LSI) type that a processing algorithm is built therein, or in a field programmable gate array (FPGA) type. The processor 130 may perform various functions by executing computer executable instructions stored in the memory 110.

In the meantime, the processor 130 may obtain a first signal of the eARC format based on the predetermined parameter, control the communication interface 120 to transmit the obtained first signal to the external speaker 200, based on receiving a first error signal corresponding to the first signal transmitted from the external speaker 200 via the communication interface, change the parameter, obtain a second signal of the eARC format based on the changed parameter, and control the communication interface 120 to transmit the obtained second signal to the external speaker 200.

Here, the electronic apparatus 100 may refer to a device for transmitting audio data to the external speaker 200. Here, for example, the memory 110 may autonomously store audio data, and the electronic apparatus 100 may transmit the audio data stored in the memory 110 to the external speaker 200 in an eARC format based on a user command. As another example, the processor 130 may receive audio data from the external source device 300, and may transmit the received audio data to the external speaker 200 in an eARC format.

Here, before transmitting the audio data or while transmitting the audio data, the processor 130 may determine whether the eARC signal may be normally outputted from the external device. Specifically, the external speaker 200 may detect whether an error has occurred by analyzing an eARC signal received from the electronic apparatus 100. The electronic apparatus 100 may transmit an error signal to the electronic apparatus 100 when an error occurs in the eARC signal received from the electronic apparatus 100.

Here, the processor 130 may, based on receiving an error signal from the external speaker 200, determine that the eARC signal transmitted by the electronic apparatus 100 is abnormal and may change a parameter.

In the meantime, the parameter may include at least one of an amplitude, duty cycle, rise time, or fall time of a signal.

In the meantime, the change operation of the parameter may vary according to the type of the first signal. Specifically, if the first signal is a signal including control information, the parameter changed in generating the first signal may be at least one of an amplitude, a rise time, or a fall time of the signal. Here, the signal including the control information may be transmitted using a common mode data channel (CMDC) included in the eARC.

Meanwhile, if the first signal is a signal including audio data, the parameter changed in generating the first signal may be at least one of an amplitude, a duty cycle, a rise time, or a fall time of the signal. Here, the signal including the audio data may be transmitted using a differential mode audio channel (DMAC) included in the eARC.

In the meantime, both a signal including control information and a signal including audio data are expressed as the first signal, but the signals refer to physically different signals. The first signal may not be an expression to define a specific signal and may refer to one signal transmitted from the electronic apparatus 100.

In order to clearly distinguish the foregoing, a signal including control information may be recited as a control signal and a signal including audio data may be recited as an audio signal.

According to an embodiment, the processor 130 may first transmit a control signal of the eARC format to the external speaker 200 and may identify an optimal parameter based on the error signal corresponding to the transmitted control signal. In addition, the processor 130 may transmit an audio signal to the external speaker 200 based on the identified optimal parameter.

According to another embodiment, the processor 130 may transmit an audio signal of the eARC format to the external speaker 200 and may identify an optimal parameter based on the error signal corresponding to the transmitted audio signal. In addition, the processor 130 may keep transmitting an audio signal to the external speaker 200 based on the identified optimal parameter.

Here, the amplitude of a signal may mean the magnitude of output (or output voltage) of the eARC signal. An operation of changing the amplitude of a signal will be described in FIGS. 9 to 11.

Here, the duty cycle may mean a duty ratio that is a ratio of a high part to a low part of a signal. Here, the high part of the signal may be written as a high state, and the low part of the signal may be written as a low state. Here, the duty cycle may be written as a pulse width. The operation of changing the duty cycle is described in FIGS. 12 to 16.

Here, the rise time may mean a time that is changed from a low state to a high state. An operation of changing a rise time will be described in FIGS. 17 to 20.

Here, the fall time may mean a time of changing from a high state to a low state. An operation of changing the fall time will be described in FIGS. 17 to 18 and FIGS. 21 to 22.

Here, the processor 130 may obtain a first signal based on a predetermined parameter. Here, the first signal may be described as a first signal packet, a first eARC signal, or a first eARC signal packet. Here, the processor 130 may generate a first signal based on a predetermined value of a parameter.

Here, when a first error signal is received from the external speaker 200, a new second signal may be generated by changing a part of a setting value of a parameter used in the first signal. Here, the second signal may be described as a second signal packet, a second eARC signal, or a second eARC signal packet.

Here, when the first error signal is received, the processor 130 may determine that the first signal is not normally outputted from the external speaker 200 or may determine that the channel between the electronic apparatus 100 and the external speaker 200 is not normally connected. If the first signal is not normally output or the channel is not normally connected, the consumer may not listen to high quality audio. Therefore, the processor 130 may generate a new signal (second signal) by partially changing the setting value of the parameter that was previously used, and may transmit the generated new signal (second signal) to the external speaker 200.

Here, the external speaker 200 may generate an error signal according to various criteria. Specifically, the external speaker 200 may identify whether an error signal is generated based on at least one of an amplitude, a duty cycle, a rise time, or a fall time of a received signal.

For example, the external speaker 200 may determine that the received signal is abnormal when the amplitude of the signal received from the electronic apparatus 100 is beyond the predetermined threshold range, and may generate an error signal.

As another example, if the duty cycle of the received signal from the electronic apparatus 100 is beyond the predetermined threshold range, the external speaker 200 may determine that the received signal is abnormal and may generate an error signal.

In another example, when a rise time (or a fall time) of a signal received from the electronic apparatus 100 is beyond a predetermined threshold range, the external speaker 200 may determine the received signal as abnormal and may generate an error signal.

In the meantime, the processor 130 may, based on receiving the first error signal corresponding to the first signal from the external speaker 200, obtain the second signal by increasing the amplitude of the first signal by the first magnitude.

Here, the first magnitude may be a predetermined magnitude and may refer to a fixed magnitude.

For example, it is assumed that the high state voltage of the signal is 110 mV and the low state voltage is 10 mV. Here, the amplitude of the existing first signal may be 100 mV. Here, it is assumed that the first size is 20 mV. The processor 130 may change the amplitude of the first signal from 100 mV to 120 mV.

In changing the amplitude of the signal, two schemes may be used.

For example, the processor 130 may increase the voltage output in the high state by 50% of the first size and decrease the voltage output in the low state by 50% of the first size. For example, the processor 130 may change the high state voltage from 110 mV to 120 mV, and change the low state voltage from 10 mV to 0 mV. As a result, the second signal may have an output voltage in the range from 0 mV (low state voltage) to 120 mV (high state voltage).

In another example, the processor 130 may increase a voltage output to a high state by a first magnitude and maintain a voltage output in a low state. For example, the processor 130 may change the high state voltage from 110 mV to 130 mV, and maintain the low state voltage at 10 mV. As a result, the second signal may have an output voltage in the range from 10 mV (low state voltage) to 130 mV (high state voltage).

Here, after the newly generated second signal is transmitted to the external speaker 200, the external speaker 200 may detect whether an error has occurred based on the second signal. As a result of detection, when it is determined that the normal output is not possible, the external speaker 200 may generate a second error signal corresponding to the second signal. In addition, the external speaker 200 may transmit the generated second error signal to the electronic apparatus 100.

In the meantime, the processor 130 may, when the second error signal corresponding to the second signal is received from the external speaker 200, obtain a third signal by increasing the amplitude of the second signal by the second magnitude greater than the first magnitude and may control the communication interface 120 to transmit the obtained third signal to the external speaker 200.

Here, when a second error signal is received, the processor 130 may again generate a new eARC signal. Here, when a new second error signal is received even though the amplitude is increased by the first magnitude, the processor 130 may determine that the error cannot be solved only with the changed amplitude. Accordingly, the processor 130 may increase an amplitude by a second magnitude larger than the first magnitude. This amplitude change operation may be repeated until an error signal is not received.

For example, if it is assumed that the first magnitude is 20 mV, the second magnitude may be 40 mV. Therefore, the processor 130 may change the amplitude of the third signal to 140 mV based on the amplitude (100 mV) of the existing first signal. Here, the amplitude (140 mV) of the third signal may be increased by 20 mV with respect to the amplitude (120 mV) of the second signal.

In the meantime, the processor 130 may obtain sampling data included in the first error signal, change the parameter based on the sampling data, and obtain the second signal based on the changed parameter.

Here, the sampling data may mean data of obtaining (or extracting) an output value of a signal at a sampling point in time (specific timing).

Here, the sampling data may have a different value according to sampling subjects. The data which the electronic apparatus 100 directly samples may be described as the sampling data of the electronic apparatus 100, and the data which the external speaker 200 directly samples may be described as the sampling data of the external speaker 200.

Here, the processor 130 may change a parameter based on an operation of comparing sampling data.

Specifically, the external speaker 200 may obtain sampling data and transmit the obtained sampling data to the electronic apparatus 100. In addition, the electronic apparatus 100 may analyze the sampling data received from the external speaker 200 to identify whether to change the parameter. In addition, the processor 130 may analyze the received sampling data to determine how to change the parameter.

An operation of obtaining and comparing the sampling data will be described in FIGS. 14 to 16 and FIGS. 19 to 22.

Here, the sampling data may be obtained based on the data extracted at a specific point in time. Here, the specific point in time may mean first point in time t1, second point in time t2 of FIG. 14.

Here, the sampling data may be data stored in a diverse manner.

For example, the sampling data may mean the extracted output value (e.g., voltage value) itself.

As another example, the sampling data may mean a result value determined based on the extracted output value. For example, the result value may be high or low. When the output value is greater than or equal to the threshold value, the electronic apparatus 100 or the external speaker 200 may determine the result value as high, and if the output value is less than the threshold value, the electronic apparatus 100 or the external speaker 200 may determine the result value as low. In addition, when the output value is included in the first threshold range, the electronic apparatus 100 or the external speaker 200 may determine the result value as high, and if the output value is included in the second threshold range (different from the first threshold range), the electronic apparatus 100 or the external speaker 200 may determine the result value as low.

The external speaker 200 may transmit sampling data (or a sampling result) corresponding to the received signal to the electronic apparatus 100 by including the sampling data (or sampling result) in the first error signal. Specifically, the external speaker 200 may transmit an output value or a result value of the sampling to the electronic apparatus 100.

Here, the processor 130 may change a parameter based on sampling data received from the external speaker 200. Specifically, the processor 130 may compare sampling data obtained by the electronic apparatus 100 with sampling data obtained by the external speaker 200.

Here, if the sampling data obtained by the electronic apparatus 100 and the sampling data obtained by the external speaker 200 do not match, the processor 130 may determine that the first signal is abnormal and change the parameter. In addition, the processor 130 may generate a new eARC signal (second signal) based on the changed parameter, and transmit the generated new eARC signal to the external speaker 200.

Figure 14:
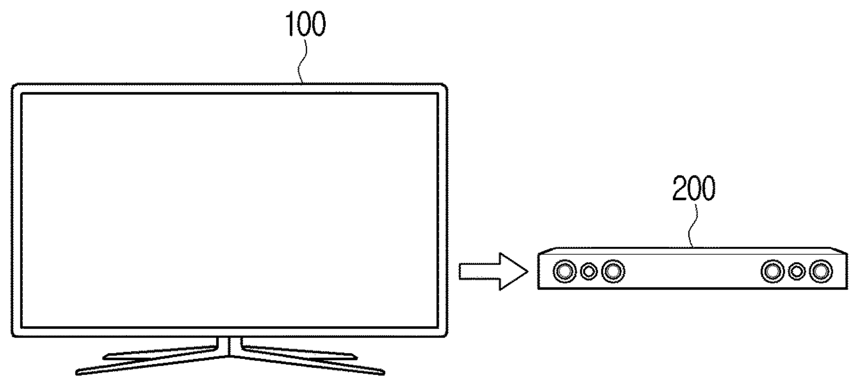
FIG. 14 is a diagram illustrating an operation of performing self-diagnosis by increasing a duty cycle of parameters.
Figure 14:
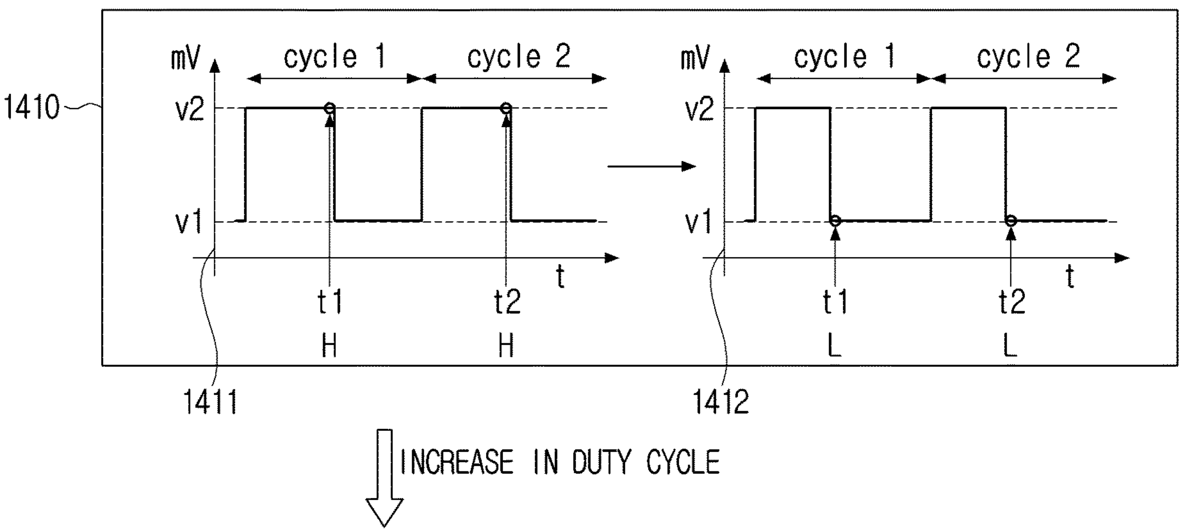
Figure 14:
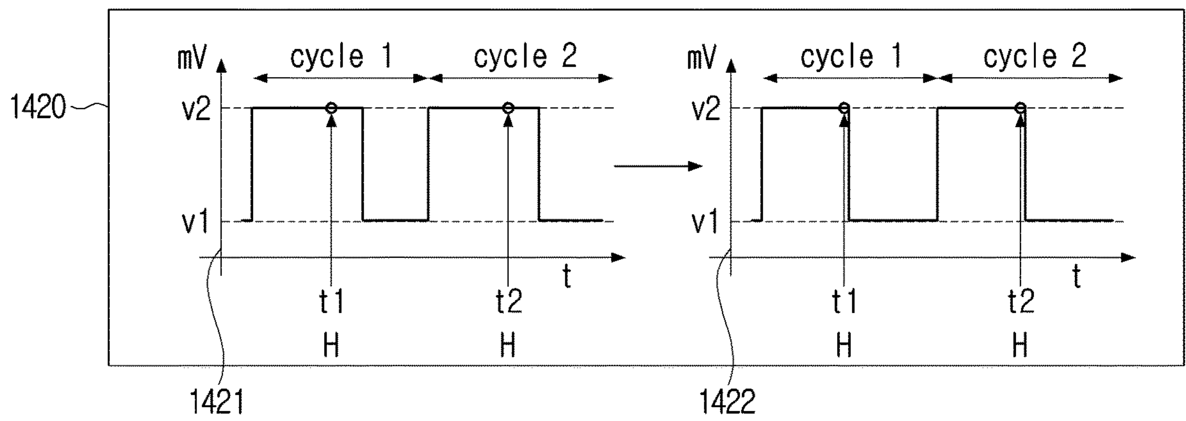
Figure 15:
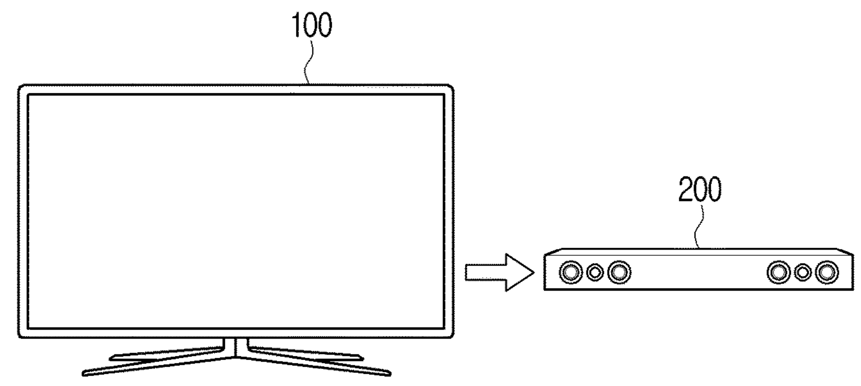
FIG. 15 is a diagram illustrating an operation of performing self-diagnosis by reducing a duty cycle of parameters.
Figure 15:
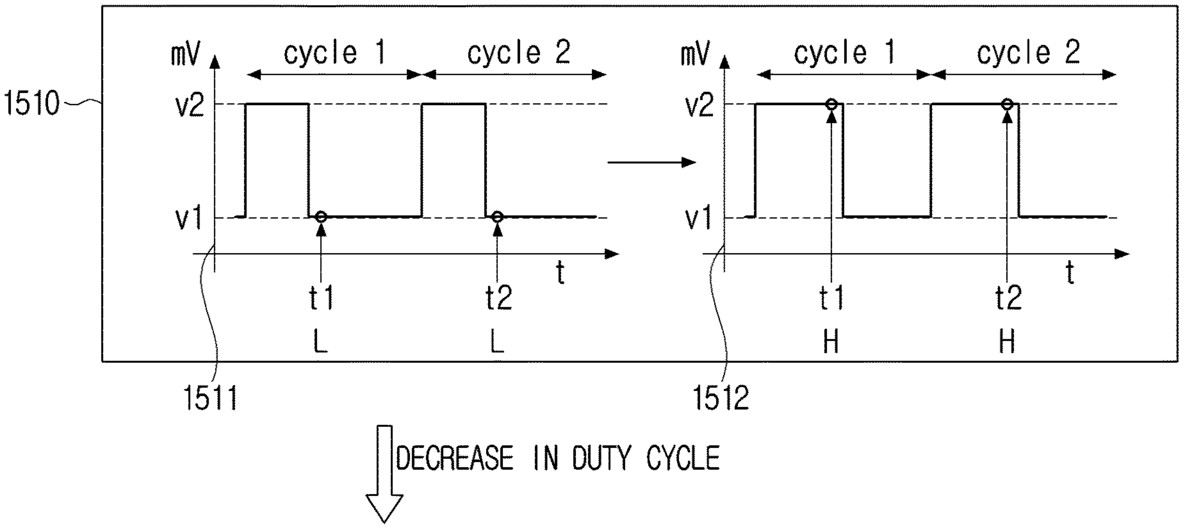
Figure 15:
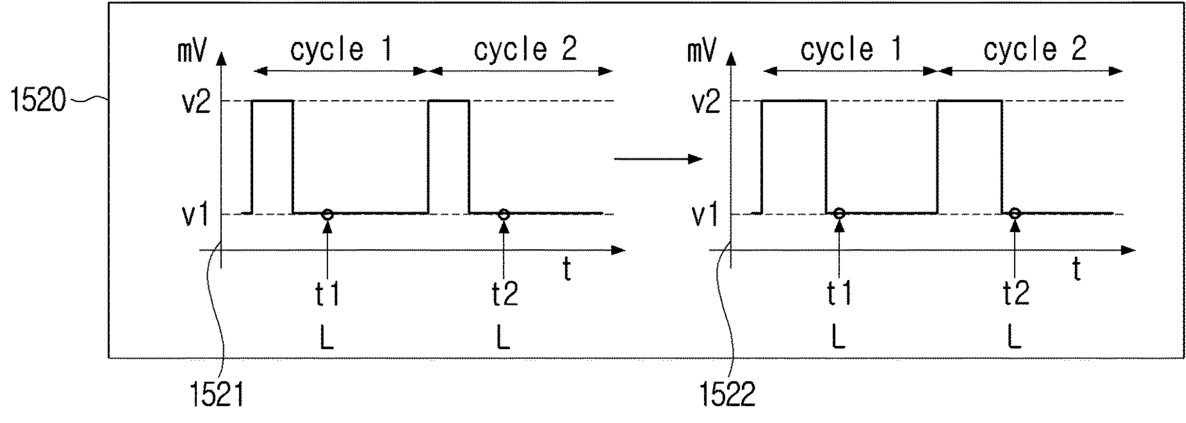
Figure 19:
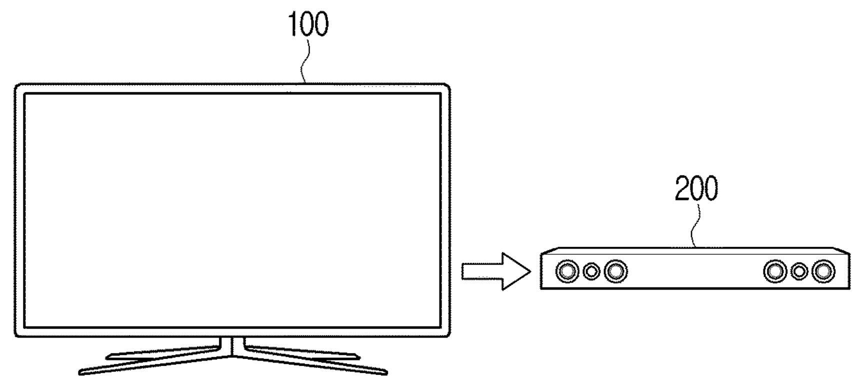
FIG. 19 is a diagram illustrating an operation of performing self-diagnosis by increasing a rise time of parameters.
Figure 19:
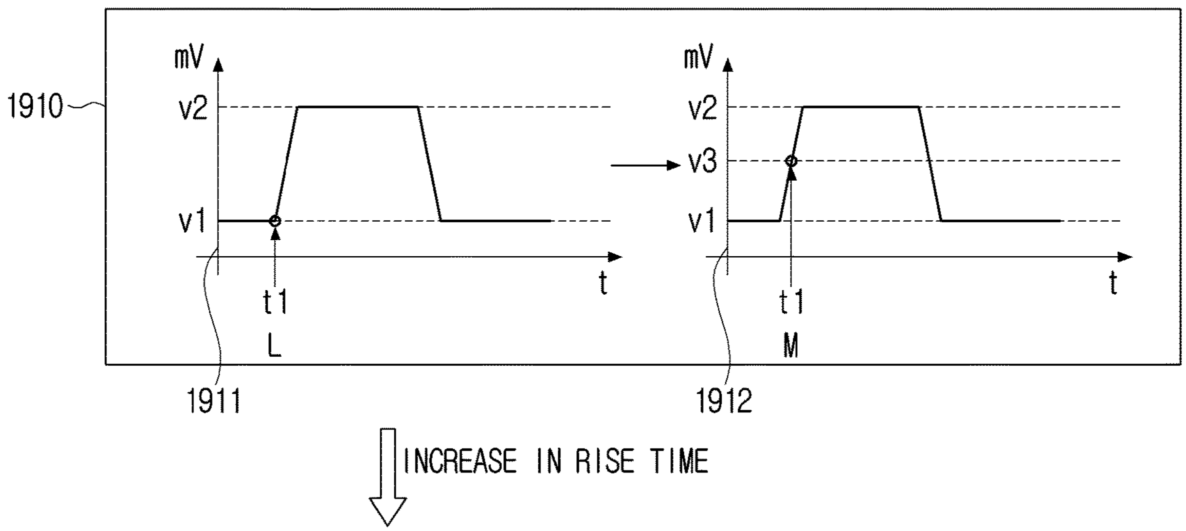
Figure 19:
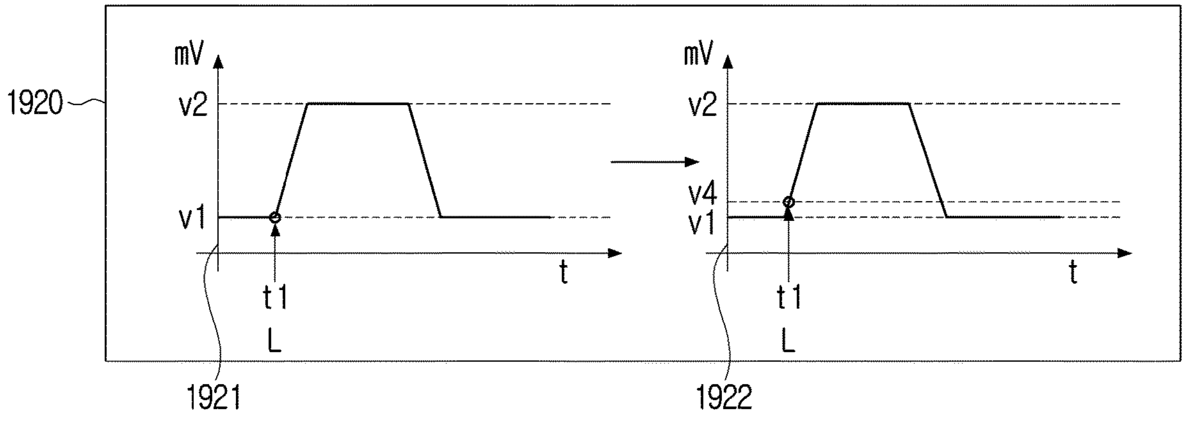
Figure 20:
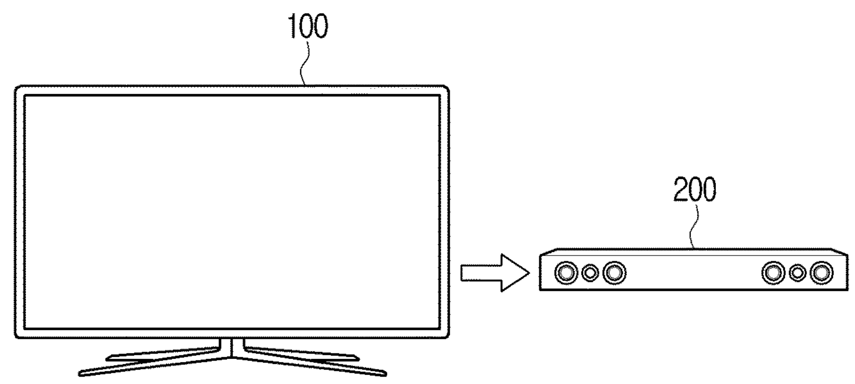
FIG. 20 is a diagram illustrating an operation of performing a self-diagnosis by reducing a rise time of parameters.
Figure 20:
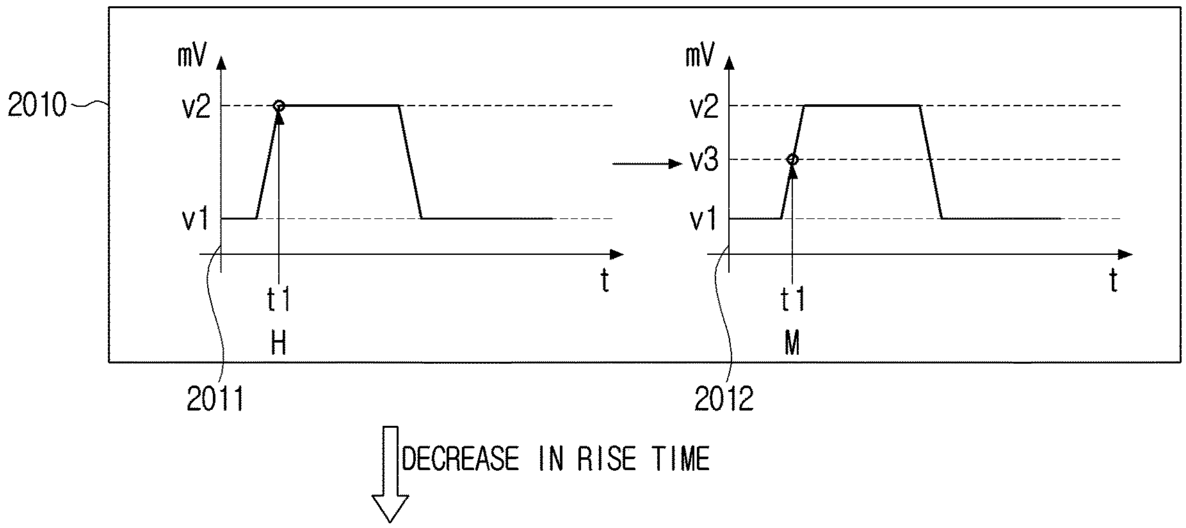
Figure 20:
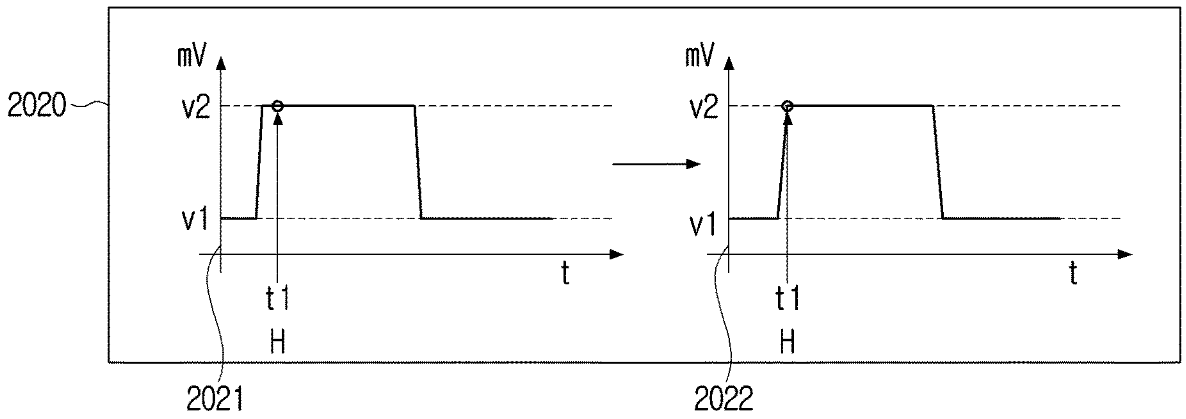
Figure 21:
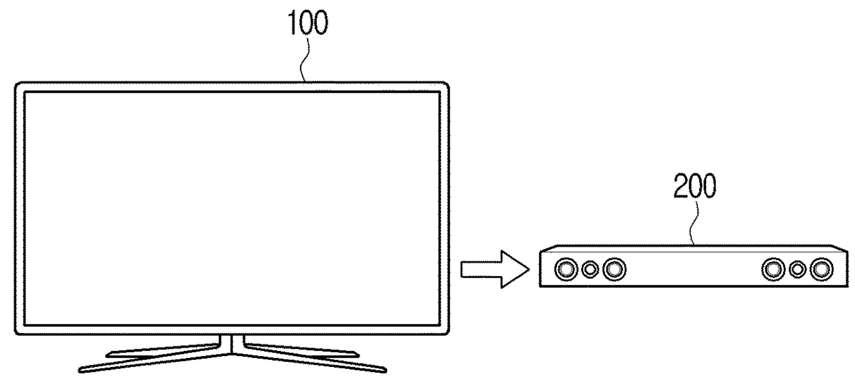
FIG. 21 is a diagram illustrating an operation of performing a self-diagnosis by increasing a fall time of parameters.
Figure 21:
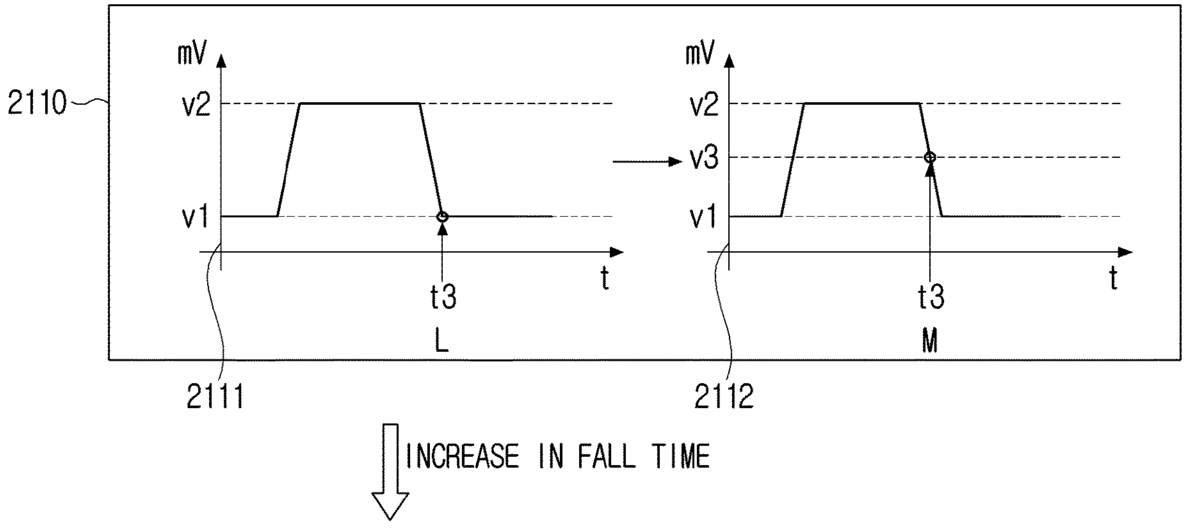
Figure 21:
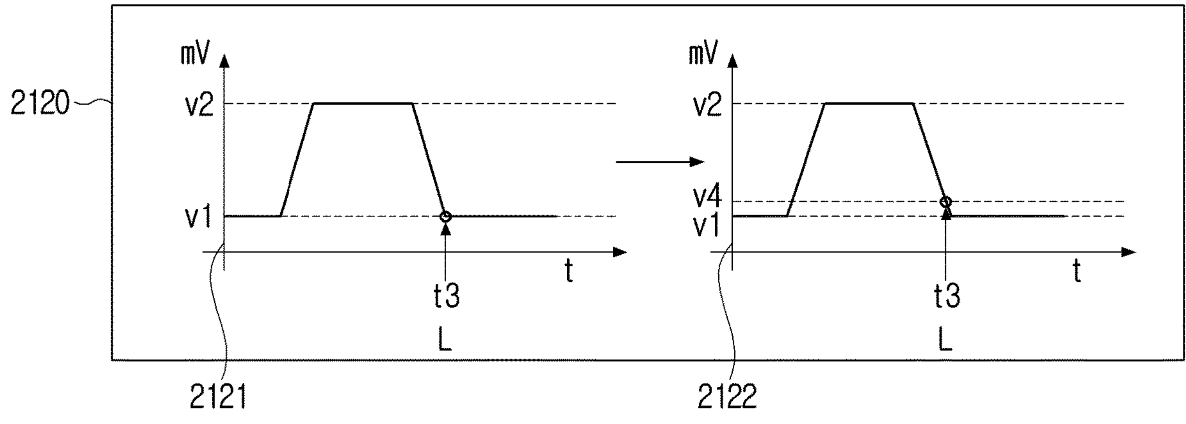
Figure 22:
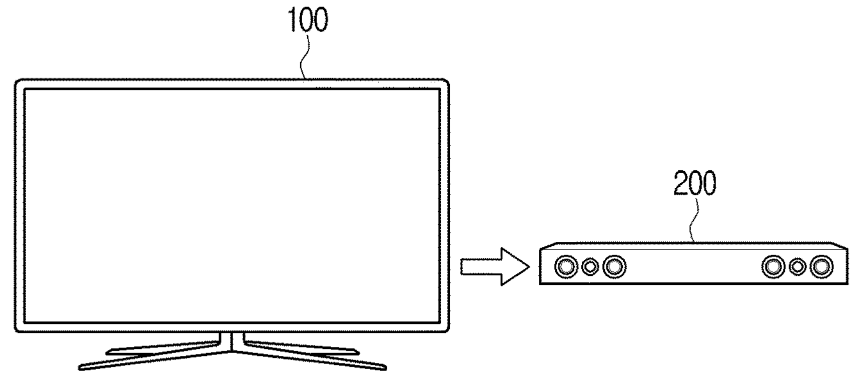
FIG. 22 is a diagram illustrating an operation of performing a self-diagnosis by reducing a fall time of parameters.
Figure 22:
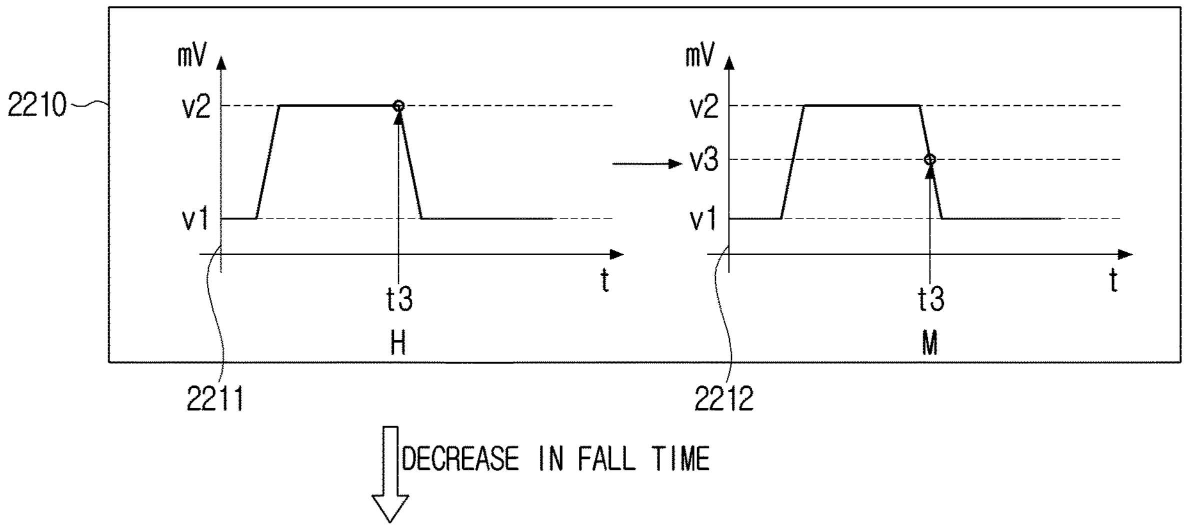
Figure 22:
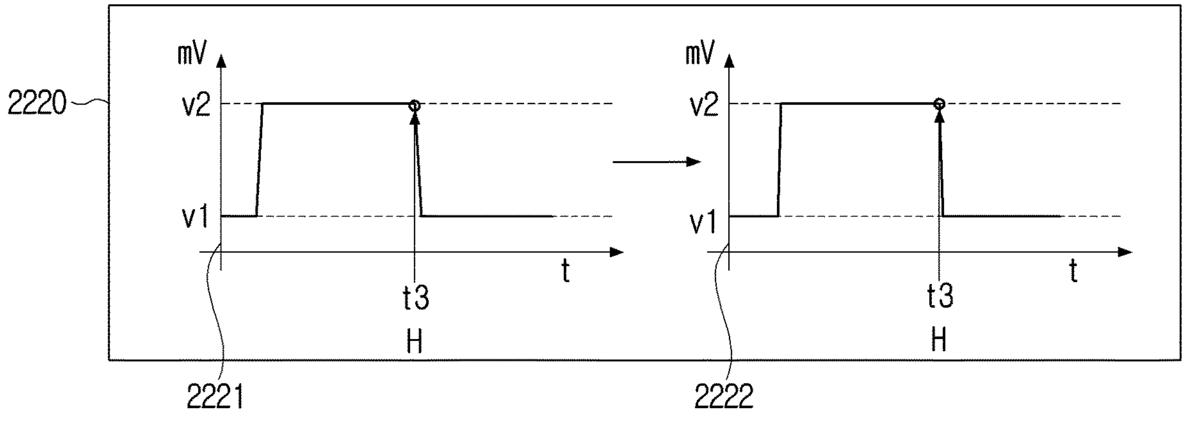

An embodiment in which the sampling data obtained by the electronic apparatus 100 and the sampling data obtained by the external speaker 200 do not match each other may be the embodiment (1410) of FIG. 14, the embodiment (1510) of FIG. 15, the embodiment (1910) of FIG. 19, the embodiment (2010) of FIG. 20, the embodiment (2110) of FIG. 21, and the embodiment (2210) of FIG. 22.

Here, if the sampling data obtained by the electronic apparatus 100 matches the sampling data obtained by the external speaker 200, the processor 130 may determine that the first signal is normal, and continue to transmit the eARC signal to the external speaker 200.

Here, an embodiment in which the sampling data obtained by the electronic apparatus 100 and the sampling data obtained by the external speaker 200 match may be the embodiment (1420) of FIG. 14, the embodiment (1520) of FIG. 15, the embodiment (1920) of FIG. 19, the embodiment (2020) of FIG. 20, the embodiment (2120) of FIG. 21, and the embodiment (2220) of FIG. 22.

In the meantime, the processor 130 may decide how to change a parameter based on the sampling data. To be specific, the processor 130 may change a setting value of a parameter by analyzing sampling data at a time point of sampling.

Here, the sampling time point may become different according to user setting. Here, the sampling time point may be described as the first time point, second time point, third time point, fourth time point, or the like.

Here, the sampling time point may be described as a time point before changing to a low state, a time point after changing to a low state, a time point before changing to a high state, a time point after changing to a high state, or the like.

In the embodiment (1410) of FIG. 14, a first time point (t1) may mean a time point before changing to a low state. In addition, in the embodiment (1510) of FIG. 15, a first time point (t1) may refer to a time point after changing to a low state. In addition, in the embodiment (1910) of FIG. 19, a first time point (t1) may mean a time point before changing to a high state. In addition, in the embodiment (2010) of FIG. 20, a first time point (t1) may refer to a time point after changing to a high state.

Here, the time point before changing to a specific state and the time point after changing to a specific state may mean a time point before or after a threshold time before changing to a specific state. For example, if it is assumed that the threshold time is 0.1 second, the sampling time point may mean at least one of a time point before 0.1 second before changing to a low state, time point before 0.1 second after changing to a low state, a time point before 0.1 second before changing to a high state, or a time point after 0.1 second after changing to a high state with respect to an original signal (signal processed by the electronic apparatus 100).

In addition, the sampling time point may mean at least one of a time point corresponding to a threshold ratio of a signal cycle. Here, it is assumed that the threshold ratio is 50% with respect to the time point corresponding to the threshold ratio of the signal cycle. Here, the sampling time point may mean a time point at which 50% is elapsed in one cycle.

An operation of changing the parameter based on the sampling time point and the sampling data is as shown below.

Here, if the sampling time point is before changing to a low state, and the sampling data at the sampling time point is greater than or equal to a threshold value, the processor 130 may determine that there is no error in the transmitted signal. This situation is a normal situation, and the external speaker 200 may not transmit an error signal.

Here, if the sampling time point is before changing to a low state and the sampling data at the sampling time point is less than a threshold value, the processor 130 may perform at least one of an operation to increase a duty cycle (see FIG. 14) or an operation to decrease a fall time (see FIG. 22).

Here, when the sampling time point is a time pint after changing to a low state and the sampling data at the sampling time point is greater than or equal to a threshold value, the processor 130 may perform at least one of an operation to decrease a duty cycle (see FIG. 15) or an operation to increase a fall time (see FIG. 21).

Here, when the sampling time point is a time point after changing to a low state and the sampling data at the sampling time point is less than a threshold value, the processor 130 may determine that there is no error in the transmitted signal. This is a normal situation where the external speaker 200 may not transmit an error signal.

Here, if the sampling time point is a time point prior to changing to a high state and sampling data at the sampling time point is greater than or equal to a threshold value, the processor 130 may perform at least one of an operation (not shown) of decreasing the duty cycle or an operation (see FIG. 19) of increasing a rise time.

Here, when the sampling time point is a time point after changing to a high state and the sampling data at the sampling time point is less than a threshold value, the processor 130 may determine that there is no error in the transmitted signal. This is a normal situation where the external speaker 200 may not transmit an error signal.

Here, when the sampling time point is a time point after changing to a high state and the sampling data at the sampling time point is greater than or equal to a threshold value, the processor 130 may determine that there is no error in the transmitted signal. This is a normal situation where the external speaker 200 may not transmit an error signal.

Here, if the sampling time point is a time point prior to changing to a high state and sampling data at the sampling time point is less than a threshold value, the processor 130 may perform at least one of an operation (not shown) of increasing the duty cycle or an operation (see FIG. 20) of decreasing a rise time.

Here, the operation of increasing the duty cycle may have a result similar to an operation of decreasing the rise time or an operation of decreasing the fall time.

Here, the operation of reducing the duty cycle may have a result similar to an operation of increasing the rise time or an operation of increasing the fall time.

In the meantime, the processor 130 may increase the duty cycle and obtain the second signal based on the increased duty cycle if the data of a predetermined first time point (a time point before changing to a low state or a time point after changing to the high state) included in the sampling data is less than a threshold value.

Here, the embodiment of increasing the duty cycle will be described in FIG. 14.

In the meantime, the processor 130 may, based on a data at a predetermined first time point (time point before changing to the low state or time point after changing to the high state) included in the sampling data being less than a threshold value, decrease the rise time and the fall time, and obtain the second signal based on the decreased rise time and the decreased fall time.

Here, the embodiment of reducing the rise time and the fall time will be described in FIGS. 20 and 22.

In the meantime, the processor 130 may, based on receiving a high-definition multimedia interface (HDMI) signal from an external source device through the communication interface 120, change the received HDMI signal to the first signal in the eARC format, and may control the communication interface 120 to transmit the converted first signal to the external speaker 200.

In the meantime, the communication interface 120 may include a common mode data channel (CMDC), and the processor 130 may transmit the first signal including control information to the external speaker 200 through the CMDC, based on receiving the first error signal corresponding to the first signal from the external speaker 200, change the parameter, and obtain the second signal based on the changed parameter, and the changed parameter used in obtaining the second signal may include at least one of an amplitude, a rise time, or a fall time of a signal.

Here, the CMDC may mean a communication channel between the electronic apparatus 100 and the external speaker 200. Here, the CMDC may transmit general control information (or a control command) rather than audio data. A signal transmitted through the CMDC may be described as a data signal, an eARC data signal.

In the meantime, the communication interface 120 may include a differential mode audio channel (DMAC), the processor 130 may transmit the first signal including audio data to the external speaker 200 through the DMAC, based on receiving the first error signal corresponding to the first signal from the external speaker 200, change the parameter, obtain the second signal based on the changed parameter, and the changed parameter used in obtaining the second signal may include at least one of an amplitude, a duty cycle, a rise time, or a fall time of a signal.

Here, the DMAC may mean the communication channel between the electronic apparatus 100 and the external speaker 200. Here, the DMAC may transmit the audio data. The signal transmitted through the DMAC may be described as an audio signal and an eARC audio signal.

The electronic apparatus 100 may receive an error signal generated in the external speaker 200 by using the eARC signal, and may perform self-diagnosis based on the received error signal. Here, the self-diagnosis may mean generating a signal in which an error signal is not generated by changing a parameter. The electronic apparatus 100 may change a parameter setting value so that an error does not occur.

In the meantime, in the above description, the electronic apparatus 100 transmits one signal to the external speaker 200, and the external speaker 200 detects an error with respect to the received signal. However, according to an implementation example, the electronic apparatus 100 may transmit a plurality of signals, not one signal, to the external speaker 200, and the external speaker 200 may detect an error with respect to the received plurality of signals. Here, the plurality of signals may be test signals, and operations related to the plurality of test signals are described in FIGS. 23 to 24.

In the meantime, if the electronic apparatus 100 finds an optimal parameter setting value through self-diagnosis, the problem of sound disconnection or mute of audio output from the external speaker 200 may not occur.

In the meantime, only a simple configuration constituting the electronic apparatus 100 has been illustrated and described in the above, but various configurations may be additionally provided during implementation. This will be described below with reference to FIG. 4.

FIG. 4 is a block diagram illustrating a specific configuration of the electronic apparatus 100 of FIG. 3.

Referring to FIG. 4, the electronic apparatus 100 may include at least one of a memory 110, a communication interface 120, a processor 130, a display 140, an operation interface 150, an input and output interface 160, a speaker 170, or a microphone 180.

The operation of the memory 110, communication interface 120, and processor 130 same as the operation described above will not be described.

The display 140 may be implemented as various types of displays such as a liquid crystal display (LCD) panel, organic light emitting diodes (OLED) display panel, a plasma display panel (PDP), or any other display structure. In the display 140, a driving circuit which may be implemented in a type of an a-Si thin film transistor (TFT), a low temperature poly silicon (LTPS) TFT, an organic TFT (OTFT), and a backlight may be included. Further, the display 140 may be implemented as at least one of a touch screen coupled with a touch sensor, a flexible display, a three-dimensional (3D) display, or the like. According to one embodiment, the display 140 may include not only a display panel to output an image but also a bezel that houses a display panel. In particular, the bezel according to one or more embodiments may include a touch sensor (not illustrated) for sensing a user interaction.

The operation interface 150 may be implemented as a device such as a button, a touch pad, a mouse, a keyboard, or a touch screen capable of performing the above-described display function and operation input function. Here, the button may be various types of buttons such as at least one of a mechanical button, a touch pad, a wheel, or the like, formed in an arbitrary area such as at least one of a front portion, a side portion, a back portion, or the like, of the outer surface of the main body of the electronic apparatus 100.

The input and output interface 160 may be implemented with at least one interface, such as, for example, and without limitation, at least one of a high-definition multimedia interface (HDMI), mobile high-definition link (MHL), universal serial bus (USB), display port (DP), Thunderbolt, video graphics array (VGA) port, RGB port, d-subminiature (D-SUB), digital visual interface (DVI), and the like. The input and output interface 160 may input or output at least one of an audio signal and a video signal. According to embodiments, the input and output interface 160 may include a port for inputting or outputting an audio signal or a video signal separately, or may be implemented as one port that inputs or outputs all the audio signals or video signals. In the meantime, the electronic apparatus 100 may transmit at least one of audio and video signals to an external device (e.g., an external display device or an external speaker) through the input and output interface 160. Specifically, an output port included in the input and output interface 160 may be connected to an external device, and the electronic apparatus 100 may transmit at least one of audio and video signals to an external device through an output port.

Here, the input and output interface 160 may be connected to the communication interface 120. The input and output interface 160 may transmit information received from the external device to the communication interface or transmit information received through the communication interface 120 to the external device.

The speaker 170 may be a component for outputting various notification sounds or voice messages as well as various audio data processed by the input and output interface 160.

The microphone 180 may include an element to receive a user voice or other sound and convert to audio data. The microphone 180 may receive the user voice in an active state. For example, the microphone 180 may be integrally formed as an integral unit on at least one of an upper side, a front side direction, a side direction, or any other suitable direction of the electronic apparatus 100. The microphone 180 may include various configurations such as a microphone for collecting user voice in an analog format, an amplifier circuit for amplifying the collected user voice, an audio-to-digital (A/D) conversion circuit for sampling the amplified user voice to convert into a digital signal, a filter circuitry for removing a noise element from the converted digital signal, or the like.

Figure 5:
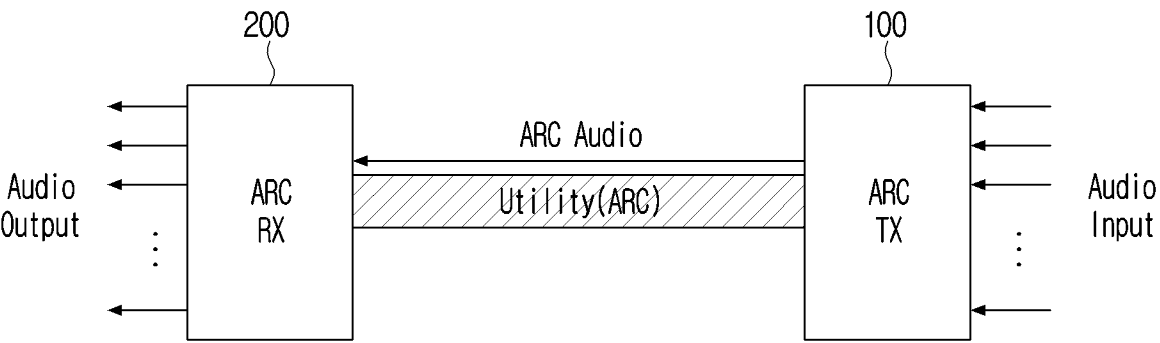
FIG. 5 is a diagram illustrating an operation using an ARC channel.

FIG. 5 is a diagram illustrating an operation using an ARC channel.

Referring to FIG. 5, the electronic apparatus 100 and the external speaker 200 may be communicatively connected using an ARC. Here, the ARC is a function that may be supported through HDMI, may have one physical line, and may have a maximum bandwidth of 1 Mbps. Here, the ARC may support only unidirectional communication.

For example, the electronic apparatus 100 may receive (or obtain) audio data and transmit the obtained audio data to the external speaker 200 by using an ARC. In addition, the external speaker 200 may output audio data received from the electronic apparatus 100.

Figure 6:
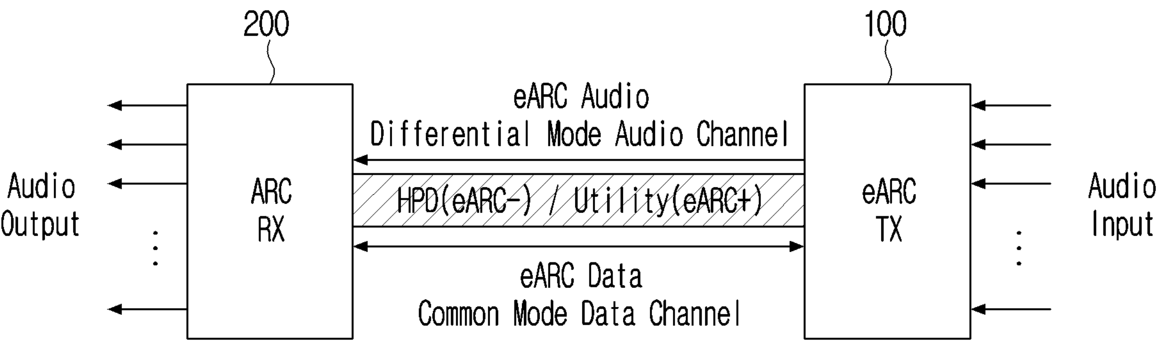
FIG. 6 is a diagram illustrating an operation using an eARC function.

FIG. 6 is a diagram illustrating an operation using an eARC function.

Referring to FIG. 6, the electronic apparatus 100 and the external speaker 200 may be communicatively connected using an eARC. Here, the eARC may provide a high-quality service by securing a wider bandwidth than the ARC. Here, the eARC functions as a supportable function through HDMI, has two physical lines, and may have a maximum bandwidth of 37 Mbps. Here, the eARC may support bi-directional communication.

Here, the eARC may include an RX device (e.g., a sound output device such as a sound bar or an AV receiver) and a TX device (e.g., a sink device such as a TV, a projector, etc.), and may include two channels of a common mode data channel (CMDC) and a differential mode audio channel (DMAC).

Here, the CMDC is a data channel through which control information (or control command) is exchanged, wherein information such as eARC discovery, disconnect, Status information, Audio Latency, Capabilities Data Structure, or the like may be exchanged.

Here, the DMAC is a channel used for transmitting audio data (or audio stream), and when the eARC discovery is completed, the DMAC is used for transmitting an audio signal in a differential mode from the output mode.

In the meantime, the eARC block may be a block included inside the HDMI block, or may be a block for converting an audio signal to an eARC format.

The communication between eARC TX and RX may be in an analog form, following I2C communication (ACK/NACK). The RX transmits an ACK to the TX when the eARC signal (or an eARC packet) is transmitted and received in a normal state. However, when a performance problem occurs and an eARC signal (or an eARC packet) is lost, an Error Correction Code (ECC) error, a NACK, and an eARC signal (or an eARC packet) etc. may be transmitted.

In a connection operation of TX and RX, if eARC TX receives the COMMA CODE transmitted by the eARC RX, the heartbeat signal may be transmitted in response thereto. After transmitting the heartbeat signal, Heartbeat-ACK/NACK communication may be performed. If the NACK occurs due to the ECC error, the eARC signal (or an eARC packet) may be retransmitted. In the meantime, when heartbeat lost occurs more than 130 ms, the eARC re-discovery may occur.

An actual audio data (or an audio stream) may be transmitted after the eARC connection is completed in an output operation of the eARC signal. If a NACK occurs due to an ECC error during the transmission of the audio data, the eARC signal (or an eARC packet) may be retransmitted.

Figure 7:
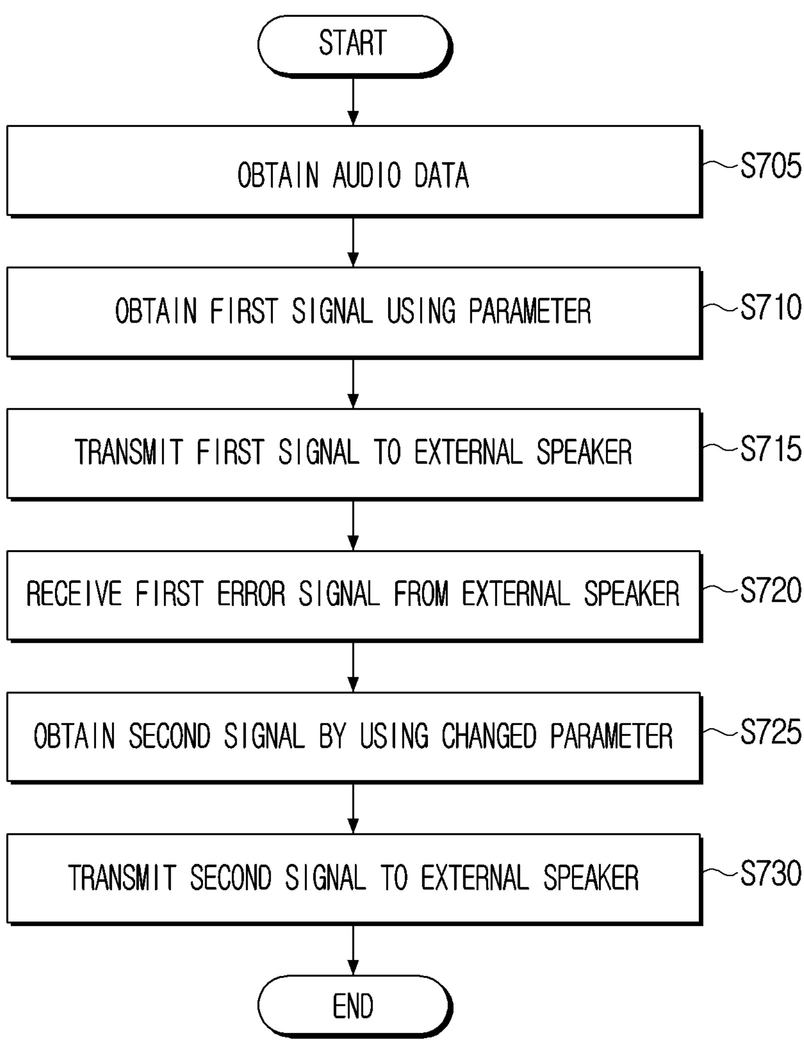
FIG. 7 is a flowchart illustrating an operation in which an electronic apparatus generates a signal by changing a parameter.

FIG. 7 is a flowchart illustrating an operation in which the electronic apparatus 100 generates a signal by changing a parameter.

Referring to FIG. 7, the electronic apparatus 100 may obtain audio data in operation S705. For example, the electronic apparatus 100 may pre-store audio data. As another example, the electronic apparatus 100 may receive audio data from the external source device 300.

Here, the electronic apparatus 100 may obtain (or generate) a first signal by using a parameter in operation S710. The electronic apparatus 100 may transmit the first signal to the external speaker 200 in operation S715. Here, the external speaker 200 may determine whether an error occurs, based on the first signal received from the electronic apparatus 100. If an error is generated by analyzing the first signal, the external speaker 200 may generate a first error signal corresponding to the first signal and transmit the generated first error signal to the electronic apparatus 100.

Here, the electronic apparatus 100 may receive a first error signal from the external speaker 200 in operation S720. When the first error signal is received from the external speaker 200, the electronic apparatus 100 may obtain (or generate) the second signal by using the changed parameter in operation S725. In addition, the electronic apparatus 100 may transmit the obtained second signal to the external speaker 200 in operation S730.

Here, a parameter used for generating the first signal and the second signal may be different. Here, the parameter may include at least one of an amplitude, a duty cycle, a rise time, or a fall time.

Figure 8:
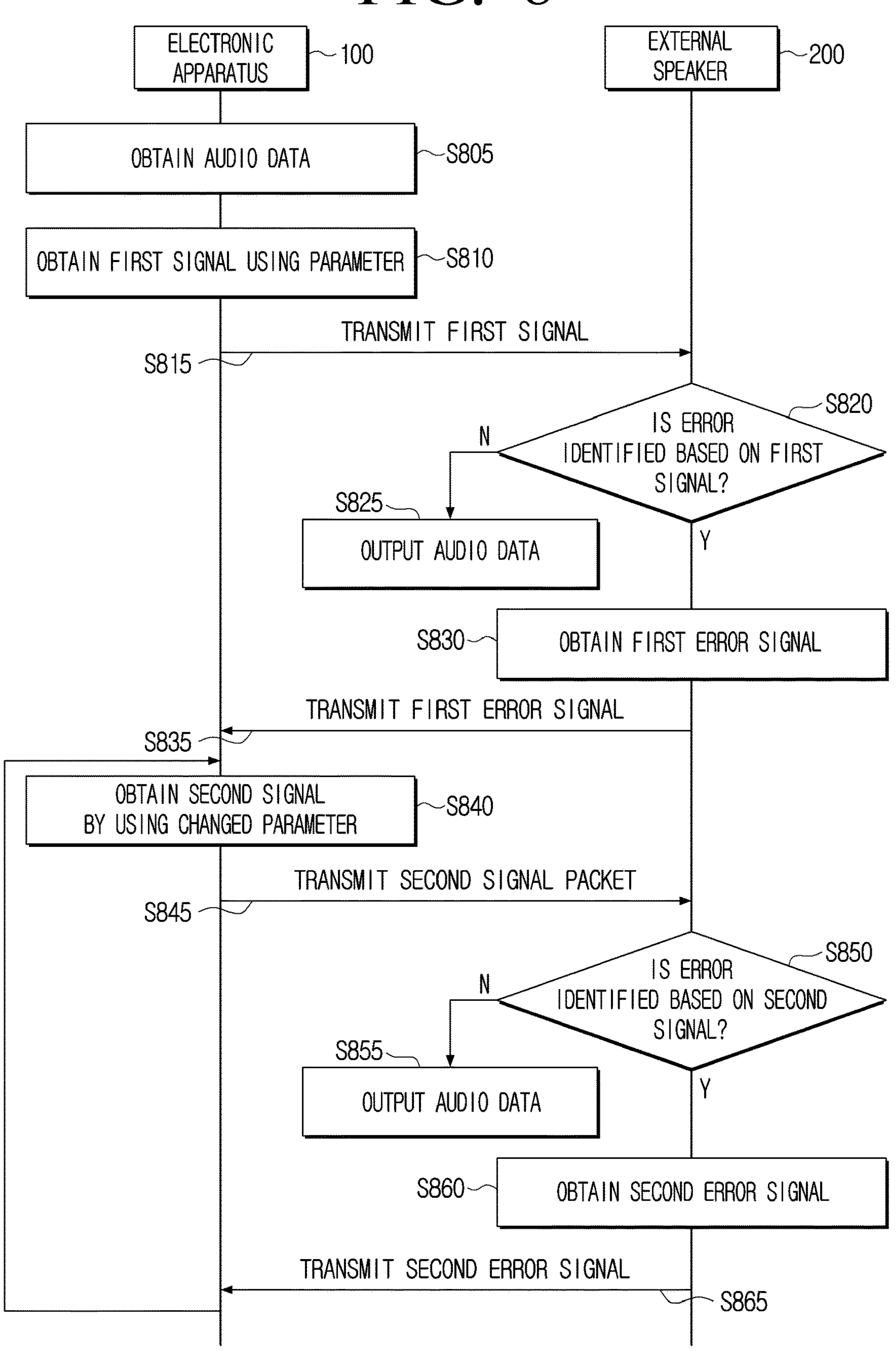
FIG. 8 is a flowchart illustrating an operation in which an electronic apparatus and an external speaker self-diagnose an error.

FIG. 8 is a flowchart illustrating an operation in which the electronic apparatus 100 and the external speaker 200 self-diagnose an error.

Referring to FIG. 8, the electronic apparatus 100 may obtain audio data in operation S805. In addition, the electronic apparatus 100 may obtain the first signal by using the parameter in operation S810. In addition, the electronic apparatus 100 may transmit the first signal to the external speaker 200 in operation S815.

Here, the external speaker 200 may receive a first signal from the electronic apparatus 100. The external speaker 200 may identify an error based on the received first signal in operation S820. Here, when an error is not identified based on the first signal in operation S820-N, the external speaker 200 may output audio data included in the first signal in operation S825.

Here, when the error is identified based on the first signal in operation S820-Y, the external speaker 200 may obtain the first error signal in operation S830. In addition, the external speaker 200 may transmit the obtained first error signal to the electronic apparatus 100 in operation S835.

Here, when the first error signal is received from the external speaker 200, the electronic apparatus 100 may obtain the second signal by using the changed parameter in operation S840. In addition, the electronic apparatus 100 may transmit the obtained second signal to the external speaker 200 in operation S845.

Here, the external speaker 200 may identify an error based on a second signal received from the electronic apparatus 100 in operation S850. Here, when an error is not identified based on the second signal in operation S850-N, the external speaker 200 may output audio data included in the second signal in operation S855.

When the error is identified based on the second signal in operation S850-Y, the external speaker 200 may obtain the second error signal in operation S860. In addition, the external speaker 200 may transmit the obtained second signal to the electronic apparatus 100 in operation S865.

Here, when the second error signal is received from the external speaker 200, the electronic apparatus 100 may repeatedly change the parameter again and may generate a new signal.

Here, the embodiment of FIG. 8 discloses an operation of detecting an error by generating one signal, and generating a new signal by changing a parameter when an error is detected to detect an error again. According to another embodiment, an error may be detected at a time by generating a plurality of signals. An embodiment related to the same is described in FIG. 23.

Figure 9:
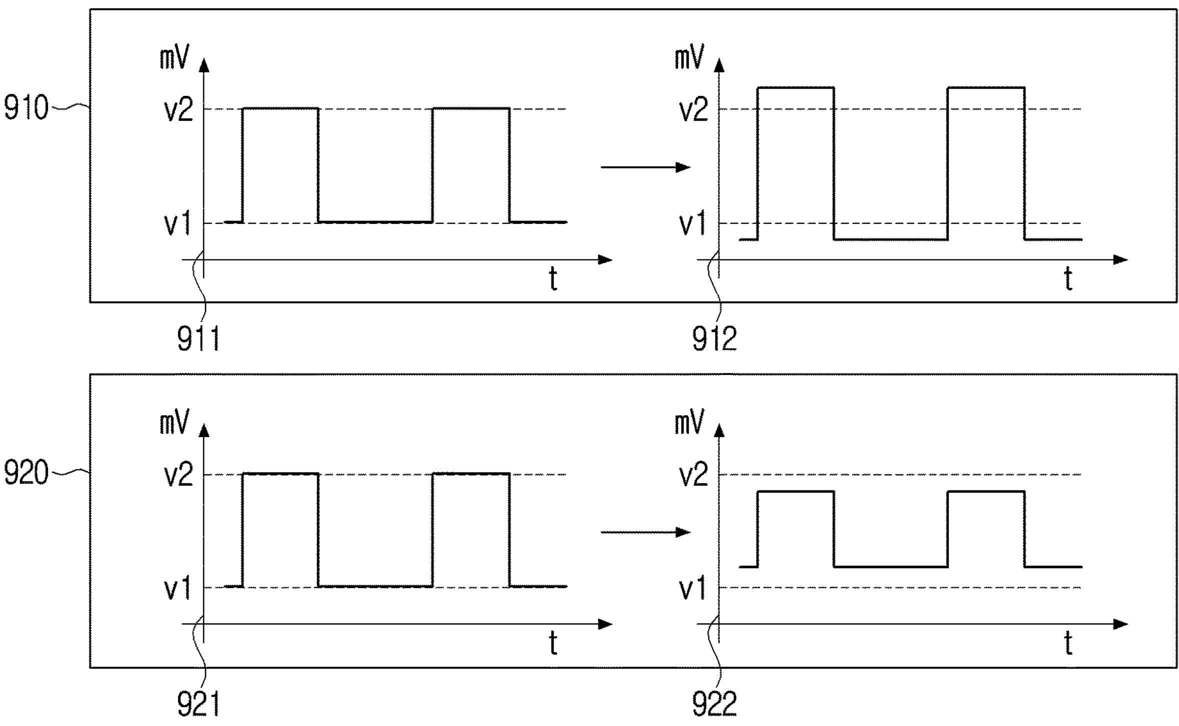
FIG. 9 is a diagram illustrating an operation of generating a signal by changing an amplitude of a parameter.

FIG. 9 is a diagram illustrating an operation of generating a signal by changing an amplitude of a parameter.

Referring to FIG. 9, the electronic apparatus 100 may increase or decrease the amplitude of a signal.

In an embodiment (910), the electronic apparatus 100 may increase the amplitude of a signal. A graph (911) may indicate a state prior to changing the amplitude of the signal. A graph (912) may indicate a state after changing the amplitude of the signal.

Referring to graph (911), the basic amplitude of a signal may be v2 in a high state and may be v1 in a low state. Referring to graph (912), the changed amplitude of the signal may be greater than v2 in a high state and may be less than v1 in a low state.

In the meantime, according to an implementation example, the amplitude may be changed in a manner in which only one of the reference voltages in the high or low state is changed. For example, after an amplitude change operation, a voltage in a high state may be greater than v2, and a voltage in a low state may be the same as v1.

In the meantime, in an embodiment (920), the electronic apparatus 100 may reduce an amplitude of a signal. The graph (921) may represent a state before changing an amplitude of a signal. The graph (922) may represent a state after changing an amplitude of a signal.

Referring to graph (921), the basic amplitude of the signal may be v2 in the high state and v1 in the low state. Referring to graph (922), the amplitude of the changed signal may be less than v2 in the high state, and greater than v1 in the low state.

In the meantime, according to an implementation example, the amplitude may be changed in a manner in which only one of the reference voltages in the high or low state is changed. For example, after the amplitude change operation, the voltage in the high state may be less than v2, and the voltage in the low state may be the same as v1.

Figure 10:
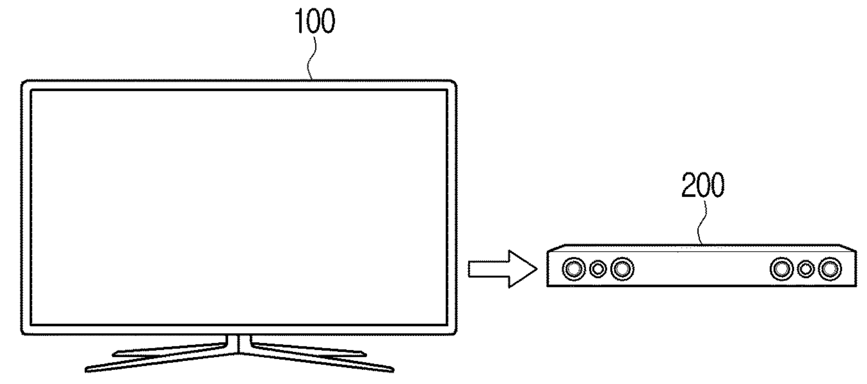
FIG. 10 is a diagram illustrating an operation of performing a self-diagnosis by increasing an amplitude of a parameter.
Figure 10:
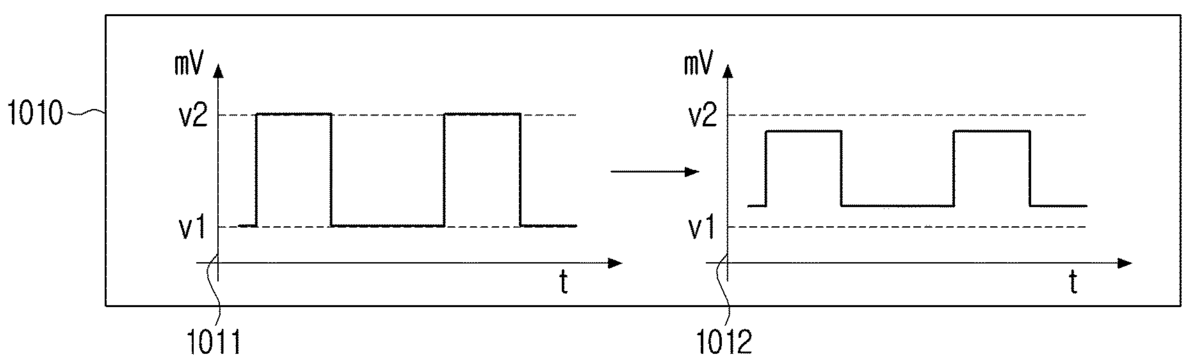
Figure 10:
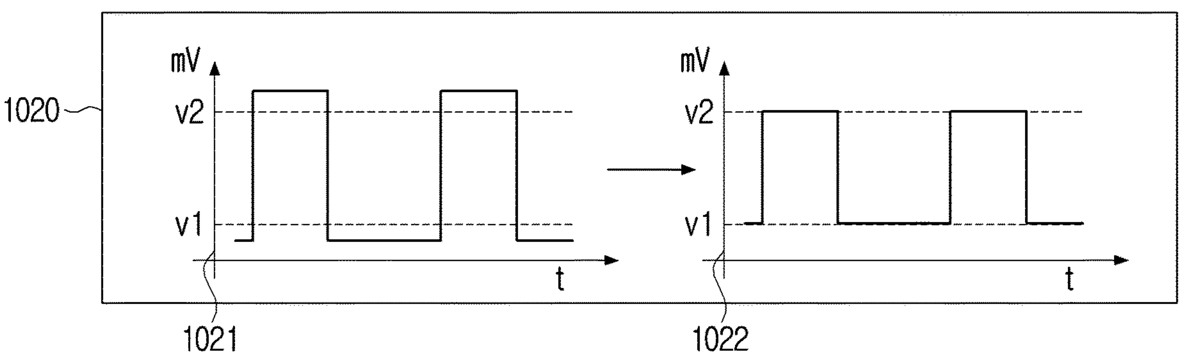

FIG. 10 is a diagram illustrating an operation of performing a self-diagnosis by increasing an amplitude of a parameter.

Referring to FIG. 10, the electronic apparatus 100 may generate a new signal in which the amplitude of a signal is increased based on the error signal received from the external speaker 200.

In an embodiment (1010), the electronic apparatus 100 may generate a first signal based on a basic amplitude and transmit the generated first signal to the external speaker 200. A graph (1011) may indicate an amplitude of a first signal obtained by the electronic apparatus 100. Here, a graph (1012) may represent an amplitude of a first signal obtained from the external speaker 200. The amplitude in the external speaker 200 may be smaller than the amplitude in the electronic apparatus 100. In the signal transmission process, the amplitude of the signal may be changed. For example, when the electronic apparatus 100 and the external speaker 200 are connected by a wired cable, the amplitude of the signal may be smaller as the cable is elongated.

Here, even if the electronic apparatus 100 has transmitted the first signal to the external speaker 200 at the amplitude of the normal range, the first signal received from the external speaker 200 may be identified as the amplitude of the abnormal range according to various reasons. When the amplitude of the first signal is identified as an abnormal range, the external speaker 200 may generate a first error signal and transmit the first error signal to the electronic apparatus 100. When the electronic apparatus 100 receives the first error signal from the external speaker 200, the electronic apparatus 100 may increase the amplitude of the signal.

In an embodiment (1020), the electronic apparatus 100 may generate a new second signal based on an amplitude greater than a basic amplitude and transmit the generated second signal to the external speaker 200. A graph (1021) may indicate an amplitude of a second signal obtained by the electronic apparatus 100. Here, a graph (1022) may represent an amplitude of a second signal obtained from the external speaker 200. Here, the external speaker 200 may identify that the amplitude of the second signal is within a normal range.

Figure 11:
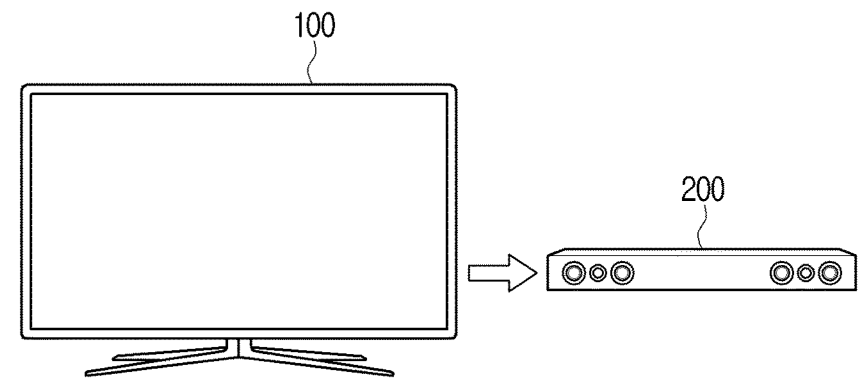
FIG. 11 is a diagram illustrating an operation of performing a self-diagnosis by reducing an amplitude of a parameter.
Figure 11:
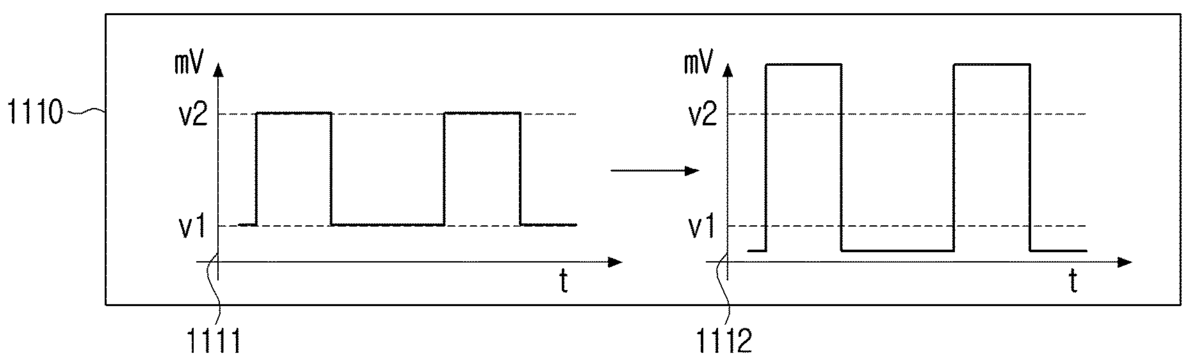
Figure 11:
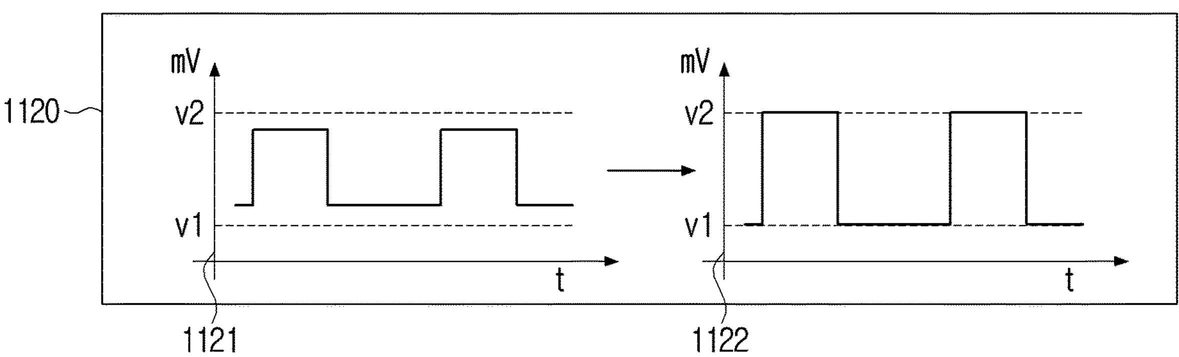

FIG. 11 is a diagram illustrating an operation of performing a self-diagnosis by reducing an amplitude of a parameter.

Referring to FIG. 11, the electronic apparatus 100 may generate a new signal having a reduced amplitude of a signal based on an error signal received from the external speaker 200.

In an embodiment (1110), the electronic apparatus 100 may generate a first signal based on a basic amplitude and transmit the generated first signal to the external speaker 200. A graph (1111) may indicate an amplitude of a first signal obtained by the electronic apparatus 100. Here, a graph (1112) may represent an amplitude of a first signal obtained from the external speaker 200. An amplitude in the external speaker 200 may be greater than an amplitude in the electronic apparatus 100. In the signal transmission process, the amplitude of the signal may be changed.

Here, even if the electronic apparatus 100 has transmitted the first signal to the external speaker 200 at the amplitude of the normal range, the first signal received from the external speaker 200 may be identified as the amplitude of the abnormal range according to various reasons. When the amplitude of the first signal is identified as an abnormal range, the external speaker 200 may generate a first error signal and transmit the first error signal to the electronic apparatus 100. When the electronic apparatus 100 receives the first error signal from the external speaker 200, the electronic apparatus 100 may reduce the amplitude of the signal.

In an embodiment (1120), the electronic apparatus 100 may generate a new second signal based on an amplitude smaller than a basic amplitude and transmit the generated second signal to the external speaker 200. A graph (1121) may indicate an amplitude of a second signal obtained by the electronic apparatus 100. Here, a graph (1122) may represent an amplitude of a second signal obtained from the external speaker 200. Here, the external speaker 200 may identify that the amplitude of the second signal is within a normal range.

Figure 12:
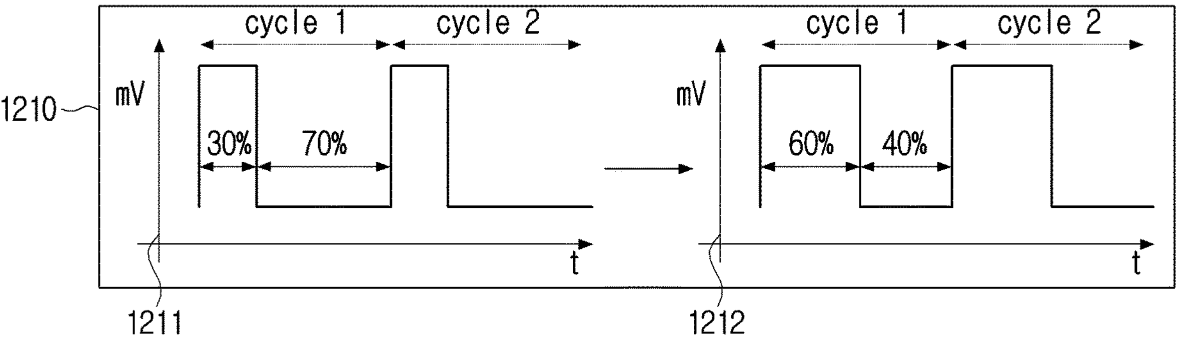
FIG. 12 is a diagram illustrating an operation of generating a signal by changing a duty cycle of parameters.
Figure 12:
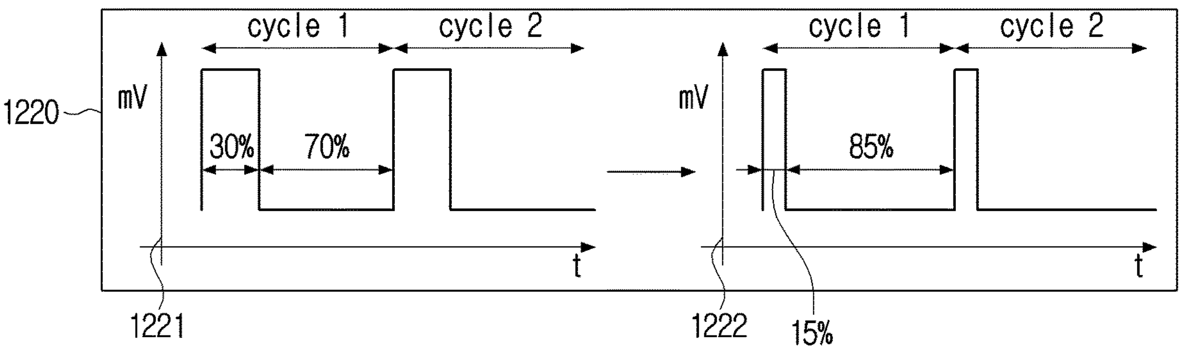

FIG. 12 is a diagram illustrating an operation of generating a signal by changing a duty cycle of parameters.

Referring to FIG. 12, the electronic apparatus 100 may increase or decrease the duty cycle.

In embodiment (1210), the electronic apparatus 100 may increase the duty cycle of a signal. A graph 1211 may indicate a state prior to changing the duty cycle of the signal. A graph 1212 may indicate a state after changing the duty cycle of the signal.

Referring to graph (1211), in the basic duty cycle of the signal, the duration in the high state may be 30% of one cycle (or period) and the duration in the low state may be 70% of one cycle. Referring to the graph (1212), in the duty cycle of the changed signal, the duration in the high state may be 60% of one cycle, and the duration in the low state may be 40% of one cycle.

In the meantime, in an embodiment (1220), the electronic apparatus 100 may reduce the duty cycle of the signal. A graph (1221) may indicate a state before changing the duty cycle of the signal. A graph (1222) may indicate a state after changing the duty cycle of the signal.

Referring to graph (1221), in the basic duty cycle of the signal, the duration in the high state may be 30% of one cycle, and the duration in the low state may be 70% of a cycle. Referring to the graph (1222), in the duty cycle of the changed signal, the duration in the high state may be 15% of one cycle and the duration in the low state may be 85% of one cycle.

Figure 13:
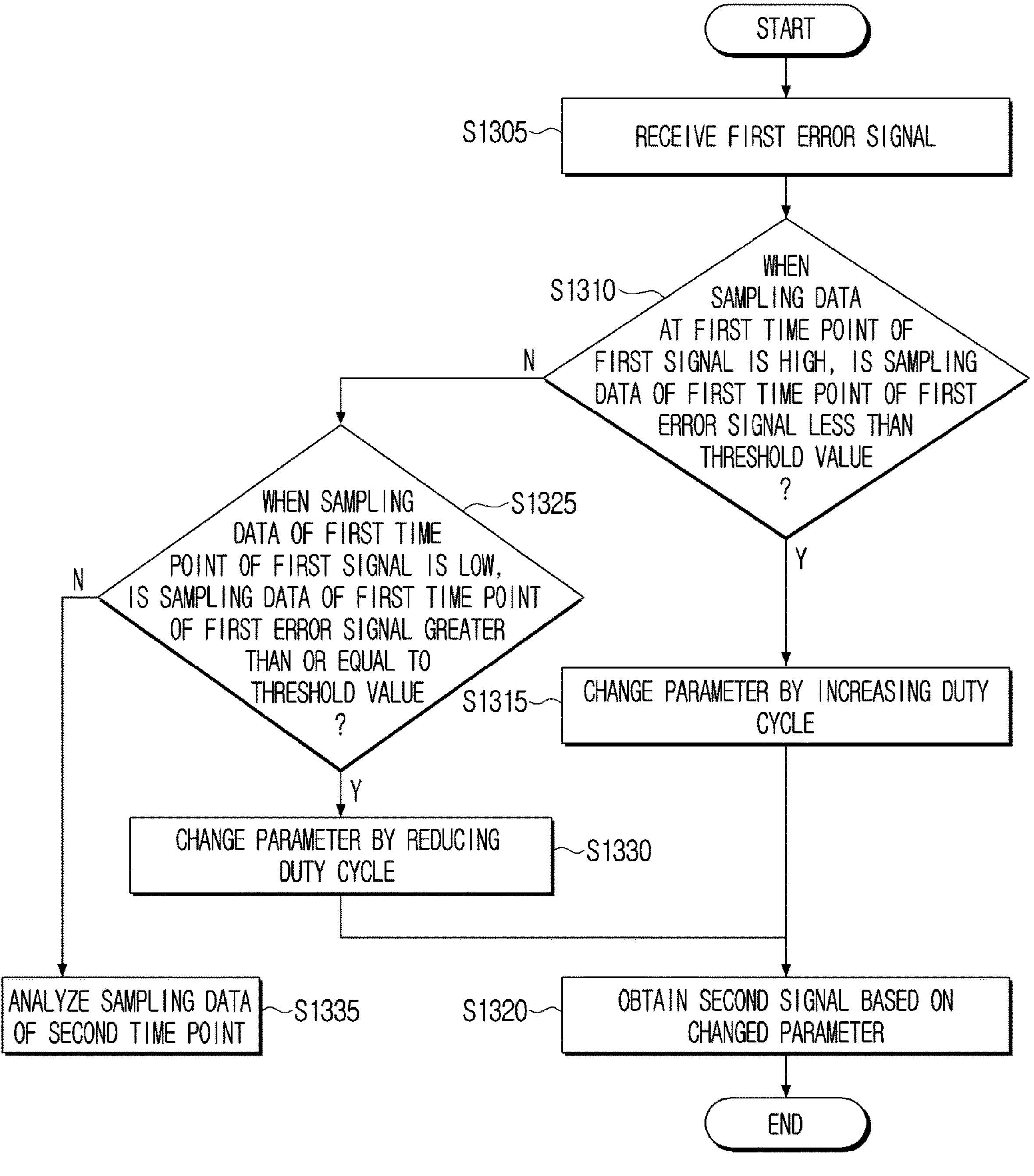
FIG. 13 is a flowchart illustrating an operation of changing a duty cycle among parameters based on sampling data.

FIG. 13 is a flowchart illustrating an operation of changing a duty cycle among parameters based on sampling data.

Referring to FIG. 13, the electronic apparatus 100 may receive a first error signal from the external speaker 200 in operation S1305. In addition, the electronic apparatus 100 may analyze sampling data of a first time point. Specifically, the electronic apparatus 100 may analyze sampling data of a first time point of a first signal and sampling data of a first time point of a first error signal.

To be specific, the electronic apparatus 100 may identify whether the sampling data at the first time point of the first signal is high, and the sampling data of the first time point of the first error signal is less than a threshold value in operation S1310.

Here, the sampling data of the first time point of the first signal is high, and the sampling data of the first time point of the first error signal is less than the threshold value in operation S1310-Y, the electronic apparatus 100 may change the parameter by increasing the duty cycle in operation S1315. The electronic apparatus 100 may obtain a second signal based on the changed parameter in operation S1320.

Here, when the sampling data of the first time point of the first signal is high but the sampling data of the first time point of the first error signal is greater than or equal to the threshold value in operation S1310-N, the electronic apparatus 100 may identify whether the sampling data of the first time point of the first signal is low and the sampling data of the first time point of the first error signal is greater than or equal to the threshold value in operation S1325.

Here, when the sampling data of the first time point of the first signal is low and the sampling data of the first time point of the first error signal is greater than or equal to the threshold value in operation S1325-Y, the electronic apparatus 100 may change the parameter by reducing the duty cycle in operation S1330. The electronic apparatus 100 may obtain a second signal based on the changed parameter in operation S1320.

Here, the sampling data of the first time point of the first signal is low and the sampling data of the first time point of the first error signal is less than the threshold value in operation S1325-N, and the electronic apparatus 100 may analyze the sampling data of the second time point in operation S1335. Specifically, the electronic apparatus 100 may analyze sampling data of a second time point of the first signal and sampling data of a second time point of the first error signal.

An operation of analyzing sampling data will be described in FIGS. 14 and 15.

FIG. 14 is a diagram illustrating an operation of performing self-diagnosis by increasing a duty cycle of parameters.

Referring to FIG. 14, the electronic apparatus 100 may generate a new signal with increased duty cycle of the signal based on the error signal received from the external speaker 200.

In an embodiment (1410), the electronic apparatus 100 may generate a first signal based on a basic duty cycle and transmit the generated first signal to the external speaker 200. A graph (1411) may represent a duty cycle of a first signal obtained by the electronic apparatus 100. The graph (1412) may represent a duty cycle of a first signal obtained from the external speaker 200. The duty cycle at the external speaker 200 may be smaller than the duty cycle in the electronic apparatus 100. During a signal transmission process, a duty cycle of a signal may be changed.

The external speaker 200 may identify whether the duty cycle of the first signal received in various methods is normal or abnormal.

According to an embodiment, the external speaker 200 may identify a normal or abnormal state of a first signal by only a duty cycle. Here, even if the electronic apparatus 100 has transmitted the first signal to the external speaker 200 at a duty cycle in a normal range, a first signal received from the external speaker 200 may be identified as a duty cycle of an abnormal range according to various reasons. When the duty cycle of the first signal is identified as an abnormal range, the external speaker 200 may transmit a first error signal to the electronic apparatus 100.

According to another embodiment, the external speaker 200 may identify a normal or abnormal state of a first signal based on sampling data. Here, the electronic apparatus 100 may obtain first sampling data based on the first signal. Specifically, the electronic apparatus 100 may sample a signal at a predetermined first time point (t1) and a second time point (t2). Referring to a graph (1411), sampling data at a first time point (t1) may be high, and sampling data at a second time point (t2) may be high. The first signal may include first sampling data. Accordingly, the first sampling data obtained by the electronic apparatus 100 may be included in the first signal and transmitted to the external speaker 200.

Here, the external speaker 200 may newly obtain second sampling data based on the received first signal. Specifically, the external speaker 200 may sample a signal at a predetermined first time point (t1) and a second time point (t2). Referring to a graph (1412), sampling data at a first time point (t1) may be low and sampling data at a second time point (t2) may be low. Here, the external speaker 200 may compare the first sampling data transmitted from the electronic apparatus 100 and the second sampling data obtained directly by the external speaker 200. If the first sampling data (e.g., high-high) and the second sampling data (e.g., low-low) do not match, the external speaker 200 may generate a first error signal.

In addition, the electronic apparatus 100 may, based on receiving the first error signal from the external speaker 200, increase the duty cycle of the signal.

In an embodiment (1420), the electronic apparatus 100 may generate a new second signal based on a duty cycle greater than a basic duty cycle and transmit the generated second signal to the external speaker 200. A graph (1421) may indicate a duty cycle of a second signal obtained by the electronic apparatus 100. Here, the graph (1422) may represent a duty cycle of a second signal obtained by the external speaker 200.

In an embodiment in which the duty cycle itself identifies normality or abnormality of the second signal, the external speaker 200 may identify that the duty cycle of the second signal is in the normal range.

In an embodiment of identifying a normal or abnormal state of a second signal by using sampling data, referring to the graph (1421), sampling data at a first time point (t1) may be high, and sampling data at a second time point (t2) may be high. Also, referring to a graph (1422), sampling data at a first time point t1 may be high, and sampling data at a second time point t2 may be high. Accordingly, the external speaker 200 may identify that the first sampling data (e.g., high-high) and the second sampling data (e.g., high-high) match. In addition, the external speaker 200 may identify that the duty cycle of the second signal is within a normal range.

FIG. 15 is a diagram illustrating an operation of performing self-diagnosis by reducing a duty cycle of parameters.

Referring to FIG. 15, the electronic apparatus 100 may generate a new signal to reduce a duty cycle of a signal based on the error signal received from the external speaker 200.

In an embodiment (1510), the electronic apparatus 100 may generate a first signal based on a basic duty cycle and transmit the generated first signal to the external speaker 200. A graph (1511) may indicate a duty cycle of a first signal obtained by the electronic apparatus 100. Here, the graph (1512) may represent a duty cycle of a first signal obtained from the external speaker 200. A duty cycle in the external speaker 200 may be greater than a duty cycle in the electronic apparatus 100. During a signal transmission process, a duty cycle of a signal may be changed.

The external speaker 200 may identify whether the duty cycle of the first signal received in various ways is normal or abnormal.

According to an embodiment, the external speaker 200 may identify a normal or abnormal state of a first signal by only a duty cycle. Here, even if the electronic apparatus 100 has transmitted the first signal to the external speaker 200 at a duty cycle in a normal range, a first signal received from the external speaker 200 may be identified as a duty cycle of an abnormal range according to various reasons. When the duty cycle of the first signal is identified as an abnormal range, the external speaker 200 may transmit a first error signal to the electronic apparatus 100.

According to another embodiment, the external speaker 200 may identify a normal or abnormal state of a first signal based on sampling data. Here, the electronic apparatus 100 may obtain first sampling data based on the first signal. Specifically, the electronic apparatus 100 may sample a signal at a predetermined first time point (t1) and a second time point (t2). Referring to a graph (1511), sampling data at a first time point (t1) may be low, and sampling data at a second time point (12) may be low. The first signal may include first sampling data. Accordingly, the first sampling data obtained by the electronic apparatus 100 may be included in the first signal and transmitted to the external speaker 200.

Here, the external speaker 200 may newly obtain second sampling data based on the received first signal. Specifically, the external speaker 200 may sample a signal at a predetermined first time point (t1) and a second time point (t2). Referring to a graph (1512), sampling data at a first time point (t1) may be high, and sampling data at a second time point (t2) may be high. Here, the external speaker 200 may compare the first sampling data transmitted from the electronic apparatus 100 and the second sampling data obtained directly by the external speaker 200. The external speaker 200 may generate a first error signal if the first sampling data (e.g., low-low) and the second sampling data (e.g., high-high) do not match.

In addition, the electronic apparatus 100 may reduce the duty cycle of the signal when receiving the first error signal from the external speaker 200.

In an embodiment (1520), the electronic apparatus 100 may generate a new second signal based on a duty cycle smaller than a basic duty cycle and transmit the generated second signal to the external speaker 200. A graph (1521) may indicate a duty cycle of a second signal obtained at the electronic apparatus 100. Here, a graph (1522) may represent a duty cycle of a second signal obtained from the external speaker 200.

In an embodiment of identifying normality or abnormality of the second signal with only a duty cycle itself, the external speaker 200 may identify that the duty cycle of the second signal is in a normal range.

In an embodiment for identifying a normal or abnormal state of a second signal by using sampling data, referring to a graph (1521), sampling data at a first time point (t1) may be low and sampling data at a second time point (t2) may be low. Also, referring to a graph (1522), sampling data at a first time point (t1) may be low and sampling data at a second time point (t2) may be low. Accordingly, the external speaker 200 may identify that the first sampling data (e.g., low-low) and the second sampling data (e.g., low-low)

match. The external speaker 200 may identify that the duty cycle of the second signal is within a normal range.

Figure 16:
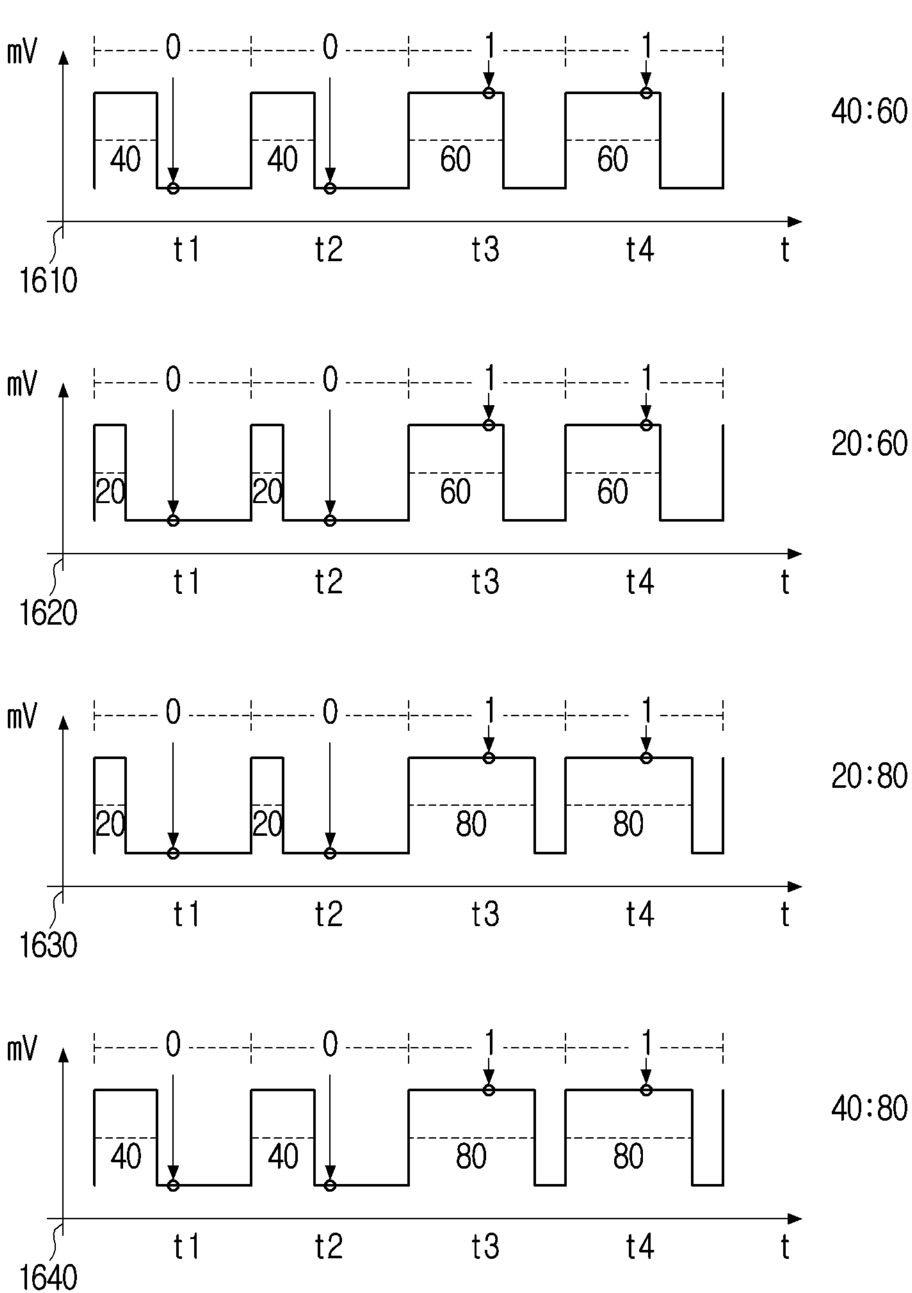
FIG. 16 is a diagram illustrating a duty cycle according to a plurality of embodiments.

FIG. 16 is a diagram illustrating a duty cycle according to a plurality of embodiments.

Referring to FIG. 16, the electronic apparatus 100 may generate a signal having various duty cycles.

Referring to the graph (1610), the electronic apparatus 100 may generate a signal having a duty cycle of 40:60. Here, the duty cycle of 40:60 may mean that the high state duration of the first pattern is 40% of the entire cycle, and the high state duration of the second pattern is 60% of the entire cycle. Therefore, a signal having a duty cycle of 40:60 may refer to a signal including a first pattern in which duration of a high state is 40% and a second pattern in which duration of a high state is 60%. Here, the sampling data may be low (may be represented by number 0) at a first time point (t1), low (may be represented by number 0) at a second time point (t2), high (may be represented by number 1) at a third time point (t3), and high (may be represented by number 1) at a fourth time (t4). Accordingly, the sampling data of the signal represented in the graph (1610) may be (low, low, high, high) or (0, 0, 1, 1). Here, the first time to the fourth time may be predetermined sampling times.

Referring to the graph (1620), the electronic apparatus 100 may generate a signal having a duty cycle of 20:60. Here, a duty cycle of 20:60 may mean that the high state duration of the first pattern is 20% of the entire cycle, and the high state duration of the second pattern is 60% of the entire cycle. Therefore, the signal having a duty cycle of 20:60 may refer to a signal including a first pattern of which the duration of the high state is 20% and a second pattern of which the duration of the high state is 60%. The sampling data of the signal represented by the graph (1620) may be (low, low, high, high) or (0, 0, 1, 1).

Referring to the graph (1630), the electronic apparatus 100 may generate a signal having a duty cycle of 20:80. Here, the duty cycle of 20:80 may mean that the high state duration of the first pattern is 20% of the entire cycle, and the high state duration of the second pattern is 80% of the entire cycle. Therefore, the signal having a duty cycle of 20:80 may mean a signal including a first pattern of which the duration of the high state is 20% and a second pattern of which the duration of the high state is 80%. The sampling data of the signal represented in the graph (1630) may be (low, low, high, high) or (0, 0, 1, 1).

Referring to the graph (1640), the electronic apparatus 100 may generate a signal having a duty cycle of 40:80. Here, the duty cycle of 40:80 may mean that the high state duration of the first pattern is 40% of the entire cycle, and the high state duration of the second pattern is 80% of the entire cycle. Therefore, a signal having a duty cycle of 40:80 may mean a signal including a first pattern having a duration of a high state of 40% and a second pattern having a duration of a high state of 80%. The sampling data of the signal represented by the graph (1640) may be (low, low, high, high) or (0, 0, 1, 1).

Figure 17:
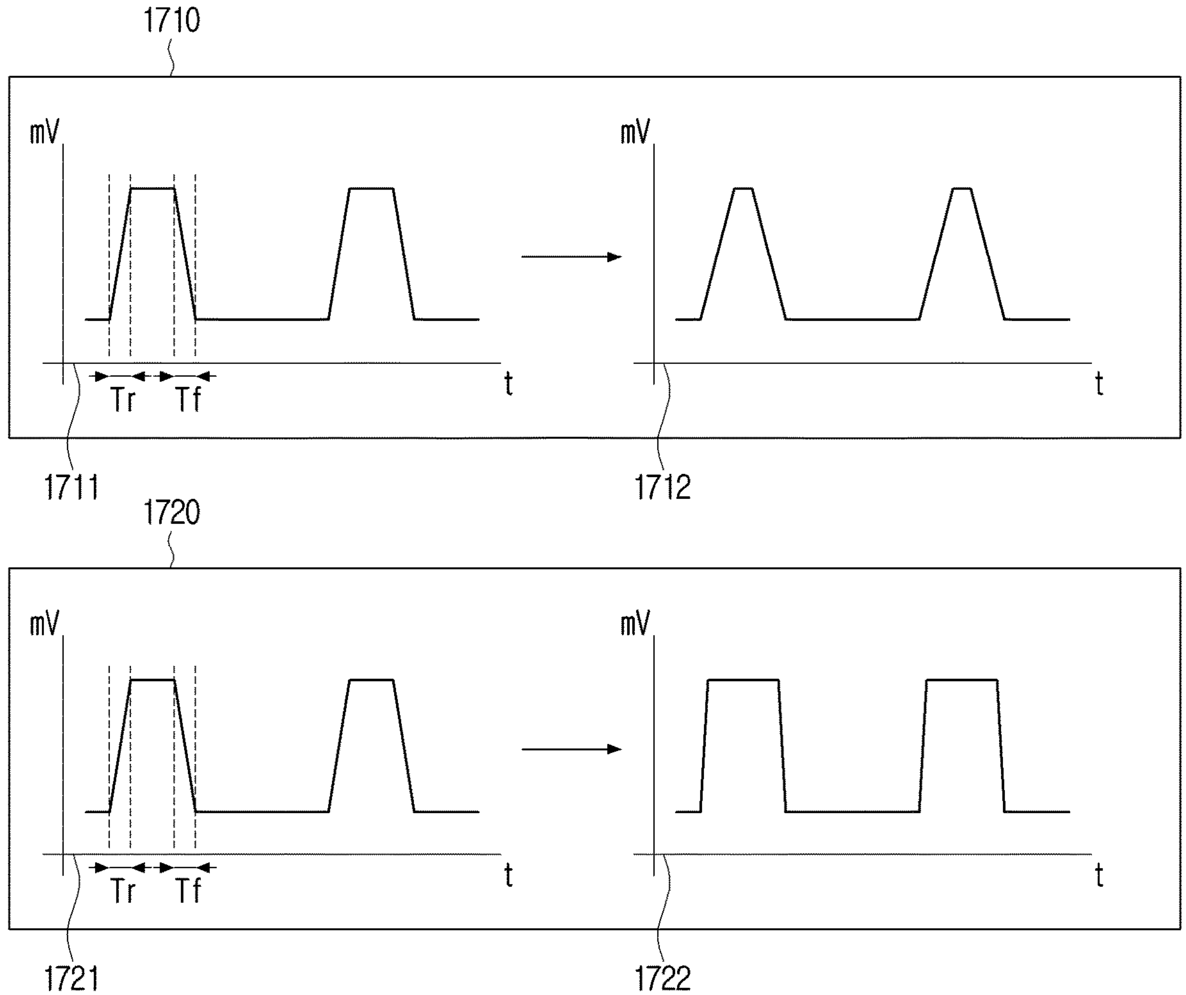
FIG. 17 is a diagram illustrating an operation of generating a signal by changing a rise time or a fall time of (or among) parameters.

FIG. 17 is a diagram illustrating an operation of generating a signal by changing a rise time or a fall time of parameters.

Referring to FIG. 17, the electronic apparatus 100 may increase or decrease a rise time (or fall time) of a signal. Here, the rise time may mean a time required for voltage to increase from a minimum voltage to a maximum voltage. Here, the fall time may be a time required for voltage to decrease from the maximum voltage to the minimum voltage. Here, the maximum voltage may be written as a voltage of a high state, and the minimum voltage may be written as a voltage in a low state.

In an embodiment (1710), the electronic apparatus 100 may increase a rise time (or fall time) of a signal. A graph (1711) may indicate a state before changing a rise time (or fall time) of a signal. A graph (1712) may indicate a state after changing a rise time (or fall time) of the signal.

Referring to graph (1711), the default rise time (or fall time) may be Tr (or Tf). Referring to graph (1712), the rise time (or fall time) of the changed signal may be greater than Tr (or Tf).

In the meantime, in an embodiment (1720), the electronic apparatus 100 may reduce a rise time (or fall time) of a signal. A graph (1721) may indicate a state before changing a rise time (or fall time) of a signal. The graph (1722) may indicate a state after changing a rise time (or fall time) of the signal.

Referring to the graph (1721), the default rise time (or fall time) of the signal may be Tr (or Tf). Referring to the graph (1722), the rise time (or fall time) of the changed signal may be less than the Tr (or Tf).

According to an embodiment, both the rise time and the fall time may change. For example, when the rise time increases, the fall time may increase together.

According to another embodiment, a rise time (or fall time) may be changed in a manner of changing either a rise time or a fall time. For example, after a rise time change operation, a rise time has been changed, but a fall time may not be changed.

Figure 18:
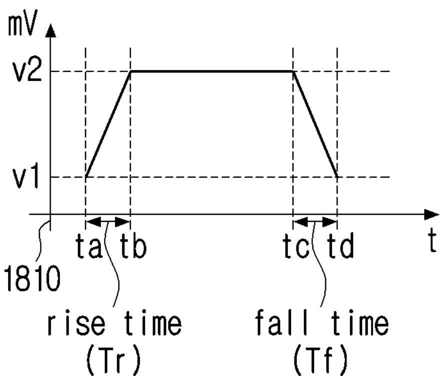
FIG. 18 is a diagram illustrating a rise time and a fall time.

FIG. 18 is a diagram illustrating a rise time and a fall time.

Referring to FIG. 18, the electronic apparatus 100 may adjust the rise time and the fall time in generating a signal.

Referring to a graph (1810), a rise time (Tr) may mean a time when a minimum voltage is changed to a maximum voltage. Specifically, the rise time (Tr) may refer to a time from a point in time (ta) at which the minimum voltage is maintained and changed to a point in time (tb) at which the maximum voltage is reached. The fall time (Tf) may mean a time during which the maximum voltage is changed to the minimum voltage. The fall time (Tf) may refer to a time from a point in time (tc) at which the maximum voltage is maintained and changed to a point in time (td) at which the minimum voltage is reached.

FIG. 19 is a diagram illustrating an operation of performing self-diagnosis by increasing a rise time of parameters.

Referring to FIG. 19, the electronic apparatus 100 may generate a new signal with increased rise time of the signal based on the error signal received from the external speaker 200.

In an embodiment (1910), the electronic apparatus 100 may generate a first signal based on the default rise time, and transmit the generated first signal to the external speaker 200. A graph (1911) may indicate a rise time of a first signal obtained by the electronic apparatus 100. Here, a graph (1912) may indicate a rise time of a first signal obtained from the external speaker 200. During a signal transmission process, a rise time of a signal may be changed.

The external speaker 200 may identify whether the rise time of the first signal received in various methods is normal or abnormal.

According to an embodiment, the external speaker 200 may identify a normal or abnormal state of the first signal by the rise time itself. Here, even if the electronic apparatus 100 has transmitted the first signal to the external speaker 200 at a rise time of a normal range, the first signal received from the external speaker 200 may be identified as a rise time of the abnormal range according to various reasons. When the rise time of the first signal is identified as an abnormal range, the external speaker 200 may transmit a first error signal to the electronic apparatus 100.

According to another embodiment, the external speaker 200 may identify a normal or abnormal state of a first signal based on sampling data. Here, the electronic apparatus 100 may obtain first sampling data based on the first signal. Specifically, the electronic apparatus 100 may sample a signal at a predetermined first time point (t1). Referring to a graph (1911), sampling data at a first time point (t1) may be low. The first signal may include first sampling data. Accordingly, the first sampling data obtained by the electronic apparatus 100 may be included in the first signal and transmitted to the external speaker 200.

Here, the external speaker 200 may newly obtain second sampling data based on the received first signal. Specifically, the external speaker 200 may sample a signal at a predetermined first time point (t1). Referring to a graph (1912), sampling data at a first time point (t1) may be a medium. Here, the medium may mean a value between high and low. Here, the external speaker 200 may compare the first sampling data transmitted from the electronic apparatus 100 and the second sampling data obtained directly by the external speaker 200. If the first sampling data (e.g., low) and the second sampling data (e.g., medium) do not match, the external speaker 200 may generate a first error signal.

In addition, the electronic apparatus 100 may, based on receiving the first error signal from the external speaker 200, increase the rise time of the signal.

In an embodiment (1920), the electronic apparatus 100 may generate a new second signal based on a rise time greater than a default rise time, and transmit the generated second signal to the external speaker 200. A graph (1921) may indicate a rise time of a second signal obtained by the electronic apparatus 100. Here, a graph (1922) may indicate a rise time of a second signal obtained from the external speaker 200.

The external speaker 200 may identify that the rise time of the second signal is within a normal range in an embodiment for identifying normality or abnormality of the second signal only by the rise time itself.

In an embodiment for identifying a normal or abnormal state of a second signal by using sampling data, referring to a graph (1921), sampling data of a first time point (t1) may be low. Also, referring to a graph (1922), the sampling data of the first time point (t1) may be low. Accordingly, the external speaker 200 may identify that the first sampling data (e.g., low) and the second sampling data (e.g., low) match. The external speaker 200 may identify that a rise time of the second signal is within a normal range.

FIG. 20 is a diagram illustrating an operation of performing a self-diagnosis by reducing a rise time of parameters.

Referring to FIG. 20, the electronic apparatus 100 may generate a new signal with reduced rise time of the signal based on an error signal received from the external speaker 200.

Here, FIG. 20 describes an operation of reducing a rise time instead of an operation of increasing a rise time, unlike FIG. 19. Therefore, a redundant description of the operation already described in FIG. 19 is omitted.

In embodiment (2010), the electronic apparatus 100 may generate a first signal based on a default rise time, and transmit the generated first signal to the external speaker 200. A graph (2011) may indicate a rise time of a first signal obtained by the electronic apparatus 100. The graph (2012) may indicate a rise time of a first signal obtained from the external speaker 200.

Referring to graph (2011), sampling data at a first time point (t1) may be high. Referring to a graph (2012), sampling data at a first time point (t1) may be medium. The external speaker 200 may generate a first error signal if the first sampling data (for example, high) does not match the second sampling data (for example, medium).

In addition, the electronic apparatus 100 may reduce the rise time of the signal upon receiving the first error signal from the external speaker 200.

In an embodiment (2020), a graph (2021) may indicate a rise time of a second signal obtained the electronic apparatus 100. Here, the graph (2022) may indicate a rise time of a second signal obtained from the external speaker 200.

Referring to graph (2021), sampling data at a first time point (t1) may be high. Also, referring to a graph (2022), sampling data at a first time point (t1) may be high. Accordingly, the external speaker 200 may identify that the first sampling data (e.g., high) and the second sampling data (e.g., high) match. The external speaker 200 may identify that a rise time of the second signal is within a normal range.

FIG. 21 is a diagram illustrating an operation of performing a self-diagnosis by increasing a fall time of parameters.

Referring to FIG. 21, the electronic apparatus 100 may generate a new signal of increasing the fall time of the signal based on the error signal received from the external speaker 200.

Here, FIG. 21 describes an operation of increasing a fall time instead of an operation of increasing a rise time, unlike FIG. 19. Therefore, a redundant description of the operation already described in FIG. 19 is omitted.

In embodiment (2110), the electronic apparatus 100 may generate a first signal based on a default fall time, and transmit the generated first signal to the external speaker 200. A graph (2111) may indicate a fall time of a first signal obtained by the electronic apparatus 100. Here, the graph (2112) may indicate a fall time of a first signal obtained from the external speaker 200.

Referring to graph (2111), sampling data at a third time point (t3) may be low. Referring to a graph (2112), sampling data at a third time point (t3) may be medium. The external speaker 200 may generate a first error signal if the first sampling data (for example, low) does not match the second sampling data (for example, medium).

In addition, the electronic apparatus 100 may increase the fall time of the signal upon receiving the first error signal from the external speaker 200.

In an embodiment (2120), a graph (2121) may indicate a fall time of a second signal obtained by the electronic apparatus 100. Here, the graph (2122) may indicate a fall time of a second signal obtained by the external speaker 200.

Referring to graph (2121), sampling data at a third time point (t3) may be low. Also, referring to a graph (2122), sampling data at a third time point (t3) may be low. Accordingly, the external speaker 200 may identify that the first sampling data (e.g., low) and the second sampling data (e.g., low) match. In addition, the external speaker 200 may identify that the fall time of the second signal is within a normal range.

FIG. 22 is a diagram illustrating an operation of performing a self-diagnosis by reducing a fall time of parameters.

Referring to FIG. 22, the electronic apparatus 100 may generate a new signal having a reduced fall time of a signal based on an error signal received from the external speaker 200.

Here, FIG. 22 describes an operation of reducing a fall time instead of an operation of increasing a rise time, unlike FIG. 19. Therefore, a redundant description of the operation already described in FIG. 19 is omitted.

In an embodiment (2210), the electronic apparatus 100 may generate a first signal based on a default fall time, and transmit the generated first signal to the external speaker 200. A graph (2211) may indicate a fall time of a first signal obtained by the electronic apparatus 100. Here, a graph (2212) may indicate a fall time of a first signal obtained from the external speaker 200.

Referring to graph (2211), sampling data at a first time point (t1) may be high. Referring to a graph (2212), sampling data at a first time point (t1) may be medium. The external speaker 200 may generate a first error signal if the first sampling data (for example, high) does not match the second sampling data (for example, medium).

In addition, the electronic apparatus 100 may, based on receiving the first error signal from the external speaker 200, reduce the fall time of the signal.

In embodiment (2220), a graph (2221) may indicate a fall time of a second signal obtained by the electronic apparatus 100. Here, the graph (2222) may indicate a fall time of a second signal obtained by the external speaker 200.

Referring to graph (2221), sampling data at a first time point (t1) may be high. Also, referring to a graph (2222), sampling data at a first time point (t1) may be high. Accordingly, the external speaker 200 may identify that the first sampling data (e.g., high) and the second sampling data (e.g., high) match. In addition, the external speaker 200 may identify that the fall time of the second signal is within a normal range.

Figure 23:
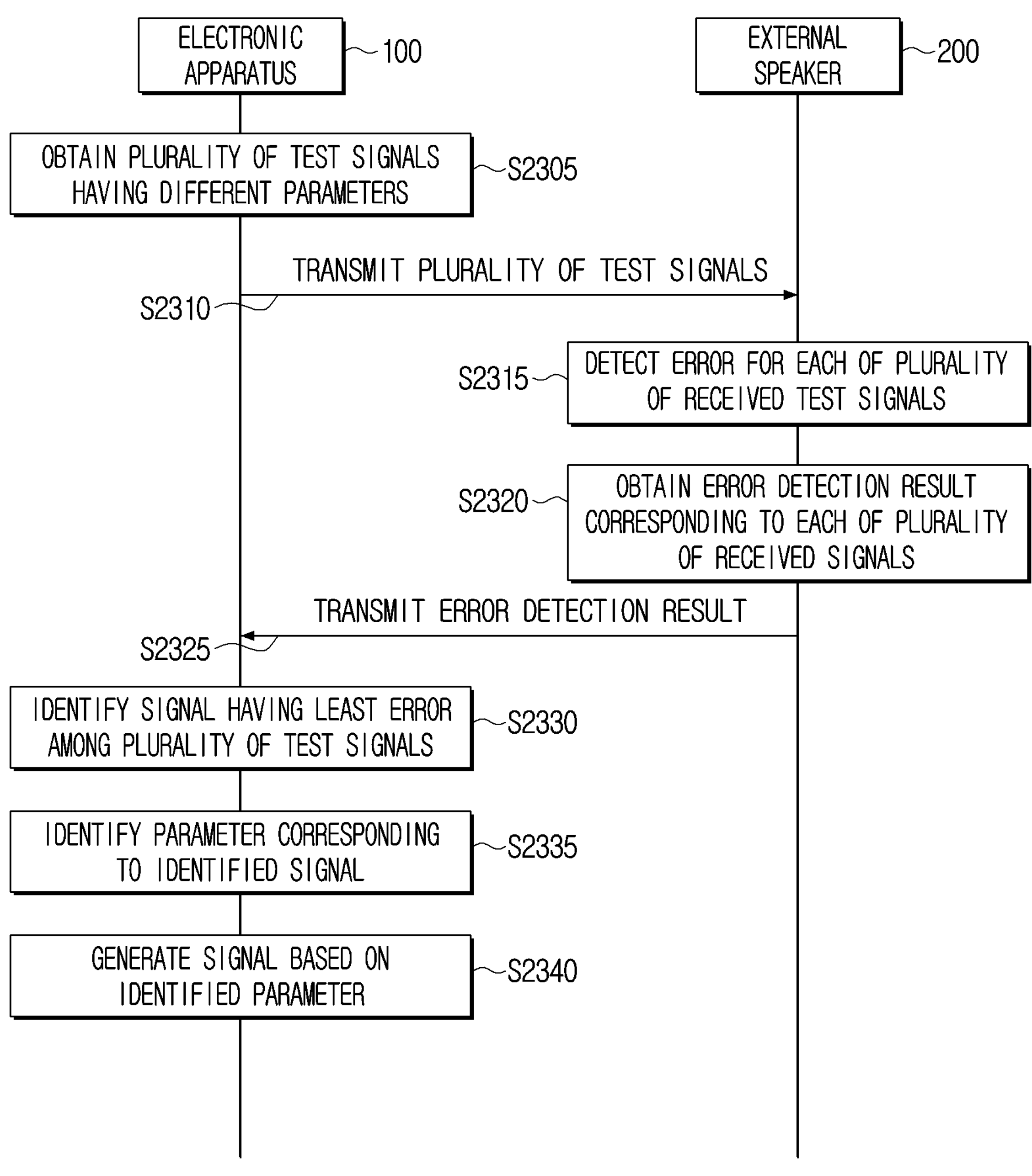
FIG. 23 is a flowchart illustrating an error self-detection operation according to another embodiment of the disclosure.

FIG. 23 is a flowchart illustrating an error self-detection operation according to another embodiment of the disclosure.

Referring to FIG. 23, the electronic apparatus 100 may obtain a plurality of test signals having different parameters in operation S2305. Here, the test signal may be a plurality of signals having different setting values corresponding to the parameters. A detailed description related to the test signal is described in FIG. 24.

The electronic apparatus 100 may transmit a plurality of test signals to the external speaker 200 in operation S2310. In addition, the external speaker 200 may detect an error for each of a plurality of test signals received from the electronic apparatus 100 in operation S2315. In addition, the electronic apparatus 100 may obtain an error detection result corresponding to each of the plurality of received test signals in operation S2320. Here, the error detection result may include the number of errors. The external speaker 200 may transmit the obtained error detection result to the electronic apparatus 100 in operation S2325.

Here, the electronic apparatus 100 may identify an optimal signal having the least error among a plurality of test signals based on an error detection result received from the external speaker 200 in operation S2330. In addition, the electronic apparatus 100 may identify a parameter corresponding to the identified optimal signal in operation S2335. The electronic apparatus 100 may generate a signal based on the identified parameter in operation S2340. FIG. 24 is a table illustrating a test signal.

Referring to FIG. 24, the electronic apparatus 100 may generate a plurality of test signals having different parameters.

Referring to table (2405), the electronic apparatus 100 may store a plurality of test signals where at least one of amplitude, duty cycle, rise time, or fall time is different. The second test signal may differ in amplitude from the first test signal. The third test signal may have a different duty cycle from the first test signal. The fourth test signal may have a different rise time from the first test signal.

The electronic apparatus 100 may transmit first to fourth test signals to the external speaker 200, and the external speaker 200 may transmit an error detection result corresponding to each test signal to the electronic apparatus 100. Based on the error detection result transmitted by the external speaker 200, it is assumed that there are three errors in the first test signal, zero errors in the second test signal, two errors in the third test signal, and one error in the fourth test signal.

Here, the electronic apparatus 100 may identify a second test signal having the smallest number of errors as an optimal signal. In addition, the electronic apparatus 100 may identify a parameter (amplitude: 120 mV, duty cycle: 30%, rise time: 10 ms, fall time: 10 ms) corresponding to the second test signal as an optimal parameter.

In addition, the electronic apparatus 100 may generate a signal based on the identified optimal parameter and transmit the generated signal to the external speaker 200. The external speaker 200 may output audio data based on a signal received from the electronic apparatus 100.

Figure 25:
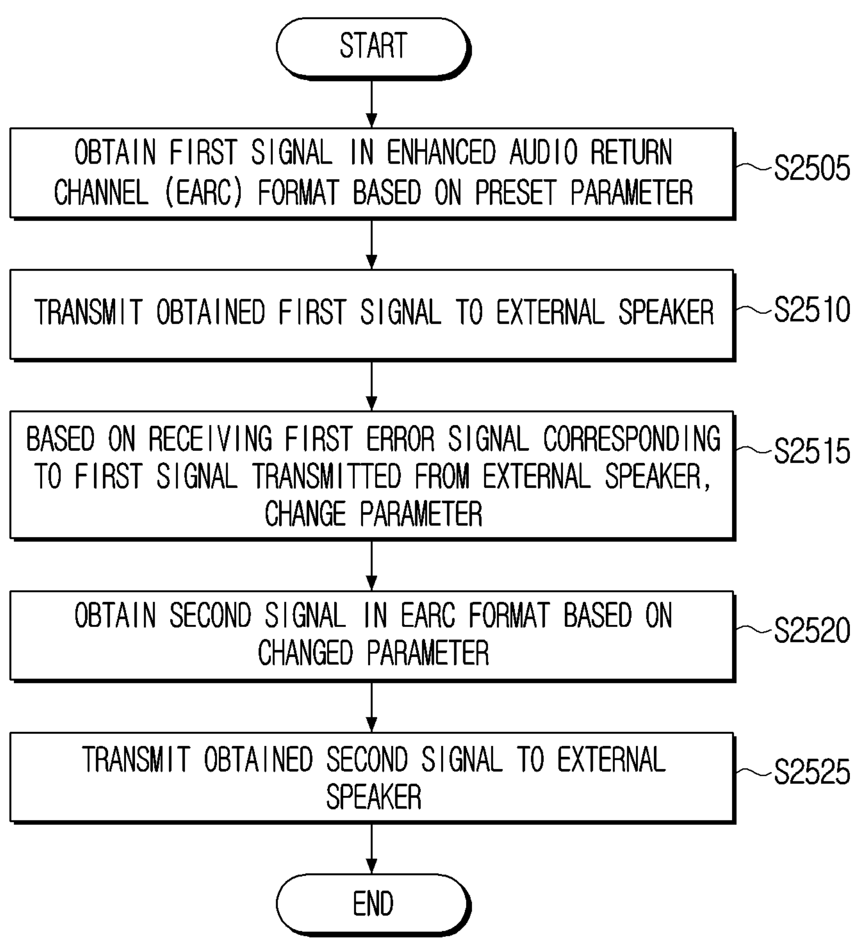
FIG. 25 is a flowchart illustrating an operation of an electronic apparatus according to an embodiment of the disclosure.

FIG. 25 is a flowchart illustrating an operation of the electronic apparatus 100 according to an embodiment of the disclosure.

Referring to FIG. 25, the method of controlling of the electronic apparatus 100 includes obtaining a first signal in an enhanced audio return channel (eARC) format based on a predetermined parameter in operation S2505; transmitting the obtained first signal to the external speaker 200 in operation S2510; based on receiving a first error signal corresponding to the first signal transmitted from the external speaker 200, changing the parameter in operation S2515; obtaining a second signal in the eARC format based on the changed parameter in operation S2520; and transmitting the obtained second signal to the external speaker 200 in operation S2525.

In the meantime, the parameter may include at least one of an amplitude, a duty cycle, a rise time, or a fall time of a signal.

In the meantime, the obtaining the second signal in operation S2520 may include, based on receiving the first error signal corresponding to the first signal from the external speaker 200, obtaining the second signal by increasing an amplitude of the first signal by first magnitude.

The method may further include, based on receiving a second error signal corresponding to the second signal from the external speaker 200, obtaining a third signal by increasing the amplitude of the second signal by a second magnitude greater than the first magnitude and transmitting the obtained third signal to the external speaker 200.

In the meantime, the obtaining the second signal in operation S2520 may include obtaining sampling data included in the first error signal, changing the parameter based on the sampling data, and obtaining the second signal based on the changed parameter.

In the meantime, the obtaining the second signal in operation S2520 may, based on the data at the predetermined first time point included in the sampling data being less than a threshold value, increase the duty cycle, and obtain the second signal based on the increased duty cycle.

In the meantime, the obtaining the second signal in operation S2520 may, based on a data at a predetermined first time point (time point before changing to the low state or time point after changing to the high state) included in the sampling data being less than a threshold value, decrease the rise time and the fall time, and obtain the second signal based on the decreased rise time and the decreased fall time.

In the meantime, the method may further include, based on receiving a high-definition multimedia interface (HDMI) signal from the external source device 300, changing the received HDMI signal to the first signal in the eARC format, and the transmitting the first signal in operation S2505 may include transmitting the converted first signal to the external speaker 200.

In the meantime, the transmitting the first signal in operation S2505 may include transmitting the first signal including control information to the external speaker 200 through the CMDC, based on receiving the first error signal corresponding to the first signal from the external speaker 200, changing the parameter, and obtaining the second signal based on the changed parameter, and the changed parameter used in obtaining the second signal may include at least one of an amplitude, a rise time, or a fall time of a signal.

In the meantime, the transmitting the first signal in operation S2505 may include transmitting the first signal including audio data to the external speaker 200 through the DMAC, and the obtaining the second signal in operation S2520 may include, based on receiving the first error signal corresponding to the first signal from the external speaker 200, changing the parameter, obtaining the second signal based on the changed parameter, and the changed parameter used in obtaining the second signal may include at least one of an amplitude, a duty cycle, a rise time, or a fall time of a signal.

The control method of the electronic apparatus 100 as shown in FIG. 25 may be executed on the electronic apparatus 100 having the configuration of FIG. 3 or FIG. 4, and may also be executed on the electronic apparatus 100 having other configurations.

The methods according to various embodiments may be implemented as a format of application installable to a related art electronic apparatus.

The methods according to various embodiments may be implemented by software upgrade of a related art electronic apparatus, or hardware upgrade only.

Also, various embodiments of the disclosure described above may be performed through an embedded server provided in the electronic apparatus 100, or through an external server of at least one of the electronic apparatus 100 and a display device.

Meanwhile, various embodiments of the disclosure may be implemented in software, including instructions stored on machine-readable storage media readable by a machine (e.g., a computer). An apparatus may call instructions from the storage medium, and execute the called instruction, including the electronic apparatus 100 according to the disclosed embodiments. When the instructions are executed by a processor, the processor may perform a function corresponding to the instructions directly or using other components under the control of the processor. The instructions may include a code generated by a compiler or a code executable by an interpreter. A machine-readable storage medium may be provided in the form of a non-transitory storage medium. Herein, the "non-transitory" storage medium may not include a signal but is tangible, and does not distinguish the case in which a data is semi-permanently stored in a storage medium from the case in which a data is temporarily stored in a storage medium.

According to one or more embodiments, the method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™) or distributed online directly. In the case of online distribution, at least a portion of the computer program product may be at least temporarily stored or temporarily generated in a server of the manufacturer, a server of the application store, or a machine-readable storage medium such as memory of a relay server.

According to various embodiments, the respective elements (e.g., module or program) of the elements mentioned above may include a single entity or a plurality of entities. According to the embodiments, at least one element or operation from among the corresponding elements mentioned above may be omitted, or at least one other element or operation may be added. Alternatively or additionally, a plurality of components (e.g., module or program) may be combined to form a single entity. The module, a program module, or operations executed by other elements according to variety of embodiments may be executed consecutively, in parallel, repeatedly, or heuristically, or at least some operations may be executed according to a different order, may be omitted, or the other operation may be added thereto.

While various embodiments have been illustrated and described with reference to various embodiments, the disclosure is not limited to specific embodiments or the drawings, and it will be understood by those of ordinary skill in the art that various changes in form and details may be made therein without departing from the spirit and scope of the disclosure, including the appended claims and their equivalents.

The invention claimed is:

1. An electronic apparatus comprising:

a communication interface; and a processor configured to:

obtain a first enhanced audio return channel (eARC) signal in an eARC format based on a predetermined parameter corresponding to the eARC, control the communication interface to transmit the obtained first eARC signal to an external speaker, based on receiving, through the communication interface, a first error signal corresponding to the first eARC signal transmitted from the external speaker, change the parameter corresponding to the eARC, obtain a second eARC signal in the eARC format based on the changed parameter corresponding to the eARC, and control the communication interface to transmit the obtained second eARC signal to the external speaker.

2. The electronic apparatus of claim 1, wherein the parameter corresponding to the eARC comprises at least one of an amplitude, a duty cycle, a rise time, or a fall time of a signal.

3. The electronic apparatus of claim 2, wherein the processor is configured to:

based on receiving the first error signal corresponding to the first eARC signal transmitted from the external speaker, obtain the second eARC signal by increasing an amplitude of the first eARC signal by a first magnitude.

4. The electronic apparatus of claim 3, wherein the processor is configured to:

based on receiving, through the communication interface, a second error signal corresponding to the second eARC signal transmitted from the external speaker, obtain a third signal by increasing an amplitude of the second eARC signal by a second magnitude greater than the first magnitude, and control the communication interface to transmit the obtained third signal to the external speaker.

5. The electronic apparatus of claim 2, wherein the processor is configured to:

obtain sampling data included in the first error signal, change the parameter corresponding to the eARC based on the sampling data, and obtain the second eARC signal based on the changed parameter.

6. The electronic apparatus of claim 5, wherein the processor is configured to:

based on data at a predetermined first time point included in the sampling data being less than a threshold value, increase the duty cycle, and obtain the second eARC signal based on the increased duty cycle.

7. The electronic apparatus of claim 5, wherein the processor is configured to:

based on data at a predetermined first time point included in the sampling data being less than a threshold value, decrease the rise time and the fall time, and obtain the second eARC signal based on the decreased rise time and the decreased fall time.

8. The electronic apparatus of claim 1, wherein the processor is configured to:

based on receiving a high-definition multimedia interface (HDMI) signal from an external source device through the communication interface, change the received HDMI signal to the first eARC signal in the eARC format, and control the communication interface to transmit the first eARC signal in the eARC format to the external speaker.

9. The electronic apparatus of claim 1, wherein the communication interface comprises a common mode data channel (CMDC), the processor is configured to:

transmit the first eARC signal including control information to the external speaker through the CMDC, based on receiving the first error signal corresponding to the first eARC signal transmitted from the external speaker, change the parameter corresponding to the eARC, and obtain the second eARC signal based on the changed parameter corresponding to the eARC, and the changed parameter corresponding to the eARC used in obtaining the second eARC signal comprises at least one of an amplitude, a rise time, or a fall time of a signal.

10. The electronic apparatus of claim 1, wherein the communication interface comprises a differential mode audio channel (DMAC), the processor is configured to:

transmit the first eARC signal including audio data to the external speaker through the DMAC, based on receiving the first error signal corresponding to the first eARC signal transmitted from the external speaker, change the parameter corresponding to the eARC, and obtain the second eARC signal based on the changed parameter corresponding to the eARC, and the changed parameter corresponding to the eARC used in obtaining the second eARC signal comprises at least one of an amplitude, a duty cycle, a rise time, or a fall time of a signal.

11. A method of controlling of an electronic apparatus, the method comprising:

obtaining a first enhanced audio return channel (eARC) signal in an eARC format based on a predetermined parameter corresponding to the eARC;

transmitting the obtained first eARC signal to an external speaker;

based on receiving a first error signal corresponding to the first eARC signal transmitted from the external speaker, changing the parameter corresponding to the eARC;

obtaining a second eARC signal in the eARC format based on the changed parameter corresponding to the eARC; and transmitting the obtained second eARC signal to the external speaker.

12. The method of claim 11, wherein the parameter corresponding to the eARC comprises at least one of an amplitude, a duty cycle, a rise time, or a fall time of a signal.

13. The method of claim 12, wherein the obtaining the second eARC signal comprises, based on receiving the first error signal corresponding to the first eARC signal transmitted from the external speaker, obtaining the second eARC signal by increasing an amplitude of the first eARC signal by first magnitude.

14. The method of claim 13, further comprising:

based on receiving a second error signal corresponding to the second eARC signal transmitted from the external speaker, obtaining a third signal by increasing an amplitude of the second eARC signal by a second magnitude greater than the first magnitude; and transmitting the obtained third signal to the external speaker.

15. The method of claim 12, wherein the obtaining the second eARC signal comprises:

obtaining sampling data included in the first error signal, changing the parameter corresponding to the eARC based on the sampling data, and obtaining the second eARC signal based on the changed parameter.

* * * * *